US011450255B2

(12) United States Patent
Shin et al.

(10) Patent No.: US 11,450,255 B2
(45) Date of Patent: Sep. 20, 2022

(54) DISPLAY PANEL, DISPLAY APPARATUS INCLUDING THE SAME AND METHOD OF DRIVING DISPLAY PANEL USING THE SAME

(71) Applicant: Samsung Display Co., Ltd., Yongin-Si (KR)

(72) Inventors: Dong Hee Shin, Asan-si (KR); Geunho Lee, Hwaseong-si (KR); Yonghee Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/223,318

(22) Filed: Apr. 6, 2021

(65) Prior Publication Data

US 2021/0375176 A1    Dec. 2, 2021

(30) Foreign Application Priority Data

May 28, 2020   (KR) .................... 10-2020-0064553

(51) Int. Cl.
*G09G 3/20*    (2006.01)
(52) U.S. Cl.
CPC ....... *G09G 3/20* (2013.01); *G09G 2310/0275* (2013.01)
(58) Field of Classification Search
CPC ... G09G 2300/0426; G09G 2310/0281; G09G 3/3648; G09G 2300/0452; G09G 2310/0267; G09G 3/3233; G09G 2300/0443; G09G 3/3674; G09G 3/20; G09G 2310/0275
See application file for complete search history.

(56) References Cited

U.S. PATENT DOCUMENTS

| 2003/0006947 | A1 | 1/2003 | Moon |
| 2013/0113766 | A1* | 5/2013 | Kim ..................... G09G 3/3674 438/34 |
| 2014/0152938 | A1 | 6/2014 | Lee et al. |
| 2014/0375922 | A1 | 12/2014 | Park et al. |
| 2017/0061837 | A1 | 3/2017 | Tang et al. |

FOREIGN PATENT DOCUMENTS

| EP | 2743765 | 6/2014 |
| KR | 1020140085775 | 7/2014 |
| KR | 1020160013470 A | 2/2016 |
| KR | 101970800 B1 | 4/2019 |
| KR | 102034112 B1 | 10/2019 |

OTHER PUBLICATIONS

Extended European Search Report—European Application 21176726.4 dated Oct. 19, 2021, citing references listed within.

* cited by examiner

*Primary Examiner* — Gerald Johnson
(74) *Attorney, Agent, or Firm* — Cantor Colburn LLP

(57) ABSTRACT

A display panel includes a plurality of blocks. The block includes a plurality of first-gate lines extending in a first direction and a plurality of second-gate lines extending in a second direction different from the first direction. The first-gate lines are connected to corresponding second-gate lines one-to-one in the block. The second-gate lines disposed in a first area of the block are connected to odd numbered first-gate lines among the plurality of first-gate lines one-to-one. The second-gate lines disposed in a second area of the block are connected to even numbered first-gate lines among the plurality of first-gate lines one-to-one.

24 Claims, 18 Drawing Sheets

DISPLAY PANEL, DISPLAY APPARATUS INCLUDING THE SAME AND METHOD OF DRIVING DISPLAY PANEL USING THE SAME

This application claims priority to Korean Patent Application No. 10-2020-0064553, filed on May 28, 2020, and all the benefits accruing therefrom under 35 U.S.C. § 119, the content of which in its entirety is herein incorporated by reference.

BACKGROUND

1. Field

Embodiments of the present inventive concept relate to a display panel, a display apparatus including the display panel and a method of driving the display panel using the display apparatus. More particularly, embodiments of the present inventive concept relate to a display panel reducing a bezel width and enhancing a display quality, a display apparatus including the display panel and a method of driving the display panel using the display apparatus.

2. Description of the Related Art

Generally, a display apparatus includes a display panel and a display panel driver. The display panel includes a gate line and a data line. The display panel driver includes a driving controller, a gate driver and a data driver.

Generally, the gate driver is disposed at a side portion of the display panel and the gate line extends in a horizontal direction in the display panel. The data driver is disposed at an upper portion or a lower portion of the display panel and the data line extends in a vertical direction in the display panel.

Due to the gate driver, a bezel width of the side portion of the display panel may increase. In addition, the gate driver and the data driver are independently manufactured and bonded so that a manufacturing cost of the display apparatus may increase.

SUMMARY

Embodiments of the present inventive concept provide a display panel reducing a bezel width of a display apparatus and reducing a propagation delay of a gate signal in a structure having the reduced bezel width to enhance a display quality of the display panel.

Embodiments of the present inventive concept also provide a display apparatus including the display panel.

Embodiments of the present inventive concept also provide a method of driving the display panel using the display apparatus.

In an embodiment of a display panel according to the present inventive concept, the display panel includes a plurality of blocks. The block includes a plurality of first-gate lines extending in a first direction and a plurality of second-gate lines extending in a second direction different from the first direction. The first-gate lines are connected to corresponding second-gate lines one-to-one in the block. The block is divided into a first area and a second area. The second-gate lines disposed in the first area of the block are connected to odd numbered first-gate lines among the plurality of first-gate lines one-to-one. The second-gate lines disposed in the second area of the block are connected to even numbered first-gate lines among the plurality of first-gate lines one-to-one.

In an embodiment, the block may further include a plurality of date lines extending in the second direction.

In an embodiment, the first-gate lines may be disposed on a first layer. The second-gate lines and the data lines may be disposed on a second layer different from the first layer. The first-gate lines may be connected to the corresponding second-gate lines through contact holes.

In an embodiment, three data lines may be disposed between two adjacent second-gate lines.

In an embodiment, a first virtual line generated by connecting points where the first-gate lines and the corresponding second-gate lines are connected in the first area and a second virtual line generated by connecting points where the first-gate lines and the corresponding second-gate lines are connected in the second area may form a V-shape.

In an embodiment, the plurality of first-gate lines includes first to 2N-th first-gate lines, the plurality of second-gate lines includes first to 2N-th second-gate lines, and N is an integer equal to or more than 2, the first second-gate line may be connected to the first first-gate line, the second second-gate line may be connected to the third first-gate line, the N−1-th second-gate line may be connected to the 2N−3-th first-gate line and the N-th second-gate line may be connected to the 2N−1-th first-gate line in the first area. The N+1-th second-gate line may be connected to the 2N-th first-gate line, the N+2-th second-gate line may be connected to the 2N−2-th first-gate line, the 2N−1-th second-gate line may be connected to the fourth first-gate line, and the 2N-th second-gate line may be connected to the second first-gate line in the second area.

In an embodiment, a first virtual line generated by connecting points where the first-gate lines and the corresponding second-gate lines are connected in the first area and a second virtual line generated by connecting points where the first-gate lines and the corresponding second-gate lines are connected in the second area may be parallel to each other.

In an embodiment, the plurality of first-gate lines includes first to 2N-th first-gate lines, the plurality of second-gate lines includes first to 2N-th second-gate lines, and N is an integer equal to or more than 2, the first second-gate line may be connected to the first first-gate line, the second second-gate line may be connected to the third first-gate line, the N−1-th second-gate line may be connected to the 2N−3-th first-gate line and the N-th second-gate line may be connected to the 2N−1-th first-gate line in the first area. The N+1-th second-gate line may be connected to the second first-gate line, the N+2-th second-gate line may be connected to the fourth first-gate line, the 2N−1-th second-gate line may be connected to the 2N−2-th first-gate line, and the 2N-th second-gate line may be connected to the 2N-th first-gate line in the second area.

In an embodiment of a display panel according to the present inventive concept, the display panel includes a plurality of blocks. The block includes a plurality of first-gate lines extending in a first direction and a plurality of second-gate lines extending in a second direction different from the first direction. The first-gate lines are connected to corresponding second-gate lines one-to-one in the block. The block is divided into first to fourth areas. The second-gate lines disposed in the first area of the block are connected to 4X−3-th first-gate lines among the plurality of first-gate lines one-to-one. The second-gate lines disposed in the second area of the block are connected to 4X−1-th first-gate lines among the plurality of first-gate lines oneto-one. The second-gate lines disposed in the third area of the block are connected to 4X−2-th first-gate lines among the plurality of first-gate lines one-to-one. The second-gate lines disposed in the fourth area of the block are connected to 4X-th first-gate lines among the plurality of first-gate lines one-to-one. The X is a natural number.

In an embodiment, a first virtual line generated by connecting points where the first-gate lines and the corresponding second-gate lines are connected in the first area, a second virtual line generated by connecting points where the first-gate lines and the corresponding second-gate lines are connected in the second area, a third virtual line generated by connecting points where the first-gate lines and the corresponding second-gate lines are connected in the third area and a fourth virtual line generated by connecting points where the first-gate lines and the corresponding second-gate lines are connected in the fourth area may form a W-shape.

In an embodiment, the plurality of first-gate lines includes first to 4N-th first-gate lines, the plurality of second-gate lines includes first to 4N-th second-gate lines, and N is an integer equal to or more than 2, the first second-gate line may be connected to the first first-gate line, the second second-gate line may be connected to the fifth first-gate line, the N−1-th second-gate line may be connected to the 4N−7-th first-gate line and the N-th second-gate line may be connected to the 4N−3-th first-gate line in the first area. The N+1-th second-gate line may be connected to the 4N−1-th first-gate line, the N+2-th second-gate line may be connected to the 4N−5-th first-gate line, the 2N−1-th second-gate line may be connected to the seventh first-gate line, and the 2N-th second-gate line may be connected to the third first-gate line in the second area. The 2N+1-th second-gate line may be connected to the second first-gate line, the 2N+2-th second-gate line may be connected to the sixth first-gate line, the 3N−1-th second-gate line may be connected to the 4N−6-th first-gate line, and the 3N-th second-gate line may be connected to the 4N−2-th first-gate line in the third area. The 3N+1-th second-gate line may be connected to the 4N-th first-gate line, the 3N+2-th second-gate line may be connected to the 4N−4-th first-gate line, the 4N−1-th second-gate line may be connected to the eighth first-gate line, and the 4N-th second-gate line may be connected to the fourth first-gate line in the fourth area.

In an embodiment of a display apparatus according to the present inventive concept, the display apparatus includes a display panel, a gate driver and a data driver. The display panel is configured to display an image. The gate driver is configured to output gate signals to the display panel. The data driver is configured to output a data voltage to the display panel. The display panel includes a plurality of blocks. The block includes a plurality of first-gate lines extending in a first direction and a plurality of second-gate lines extending in a second direction different from the first direction. The first-gate lines are connected to corresponding second-gate lines one-to-one in the block. The block is divided into a first area and a second area. The second-gate lines disposed in a first area of the block are connected to odd numbered first-gate lines among the plurality of first-gate lines one-to-one. The second-gate lines disposed in a second area of the block are connected to even numbered first-gate lines among the plurality of first-gate lines one-to-one.

In an embodiment, the block of the display panel may include a plurality of date lines extending in the second direction.

In an embodiment, the first-gate lines may be disposed on a first layer. The second-gate lines and the data lines may be disposed on a second layer different from the first layer. The first-gate lines may be connected to the corresponding second-gate lines through contact holes.

In an embodiment, a first virtual line generated by connecting points where the first-gate lines and the corresponding second-gate lines are connected in the first area and a second virtual line generated by connecting points where the first-gate lines and the corresponding second-gate lines are connected in the second area may form a V-shape.

In an embodiment, the plurality of first-gate lines includes first to 2N-th first-gate lines, the plurality of second-gate lines includes first to 2N-th second-gate lines, and N is an integer equal to or more than 2, the first second-gate line may be connected to the first first-gate line, the second second-gate line may be connected to the third first-gate line, the N−1-th second-gate line may be connected to the 2N−3-th first-gate line, and the N-th second-gate line may be connected to the 2N−1-th first-gate line in the first area. The N+1-th second-gate line may be connected to the 2N-th first-gate line, the N+2-th second-gate line may be connected to the 2N−2-th first-gate line, the 2N−1-th second-gate line may be connected to the fourth first-gate line, and the 2N-th second-gate line may be connected to the second first-gate line in the second area.

In an embodiment, the gate signals may be sequentially applied to the second-gate lines such that the odd numbered first-gate lines in the first area may be scanned during a first subframe and the even numbered first-gate lines in the second area may be scanned during a second subframe after the first subframe.

In an embodiment, the gate signals may be alternately applied to the second-gate line in the first area and the second-gate line in the second area such that the first-gate lines in the block may be sequentially scanned.

In an embodiment, a first virtual line generated by connecting points where the first-gate lines and the corresponding second-gate lines are connected in the first area and a second virtual line generated by connecting points where the first-gate lines and the corresponding second-gate lines are connected in the second area may be parallel to each other.

In an embodiment, the plurality of first-gate lines includes first to 2N-th first-gate lines, the plurality of second-gate lines includes first to 2N-th second-gate lines, and N is an integer equal to or more than 2, the first second-gate line may be connected to the first first-gate line, the second second-gate line may be connected to the third first-gate line, the N−1-th second-gate line may be connected to the 2N−3-th first-gate line, and the N-th second-gate line may be connected to the 2N−1-th first-gate line in the first area. The N+1-th second-gate line may be connected to the second first-gate line, the N+2-th second-gate line may be connected to the fourth first-gate line, the 2N−1-th second-gate line may be connected to the 2N−2-th first-gate line, and the 2N-th second-gate line may be connected to the 2N-th first-gate line in the second area.

In an embodiment, the gate signals may be sequentially applied to the second-gate lines such that the odd numbered first-gate lines in the first area may be scanned during a first subframe and the even numbered first-gate lines in the second area may be scanned during a second subframe after the first frame.

In an embodiment, the gate signals may be alternately applied to the second-gate line in the first area and the second-gate line in the second area such that the first-gate lines in the block may be sequentially scanned.

In an embodiment, the display apparatus may further include a flexible circuit substrate. The gate driver may include a gate driving chip. The data driver may include a first source driving chip and a second source driving chip. The first source driving chip, the gate driving chip and the second source driving chip may be sequentially disposed in the flexible circuit substrate.

In an embodiment of a method of driving a display panel according to the present inventive concept, the display panel includes a plurality of blocks. The block includes a plurality of first-gate lines extending in a first direction, a plurality of second-gate lines extending in a second direction different from the first direction and a plurality of data lines extending in the second direction. The method includes applying gate signals to the second-gate lines disposed in a first area of the block of the display panel, applying gate signals to the second-gate lines disposed in a second area of the block of the display panel and applying data voltages to the data lines of the display panel. The first-gate lines are connected to corresponding second-gate lines one-to-one in the block. The second-gate lines disposed in the first area of the block are connected to odd numbered first-gate lines among the plurality of first-gate lines one-to-one. The second-gate lines disposed in the second area of the block are connected to even numbered first-gate lines among the plurality of first-gate lines one-to-one.

According to the display panel, the display apparatus and the method of driving the display panel, the gate driver and the data driver are disposed at one side of the display panel such that the bezel width of the side portion of the display panel may be reduced.

In addition, the first-gate lines and the second-gate lines corresponding to the first-gate lines are connected one-to-one in the first area of the block of the display panel and the first-gate lines and the second-gate lines corresponding to the first-gate lines are connected one-to-one in the second area of the block such that the propagation delay of the gate signal at a bottom side portion of the display panel may be reduced. Thus, the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present inventive concept will be explained in detail with reference to the accompanying drawings.

Figure 1:
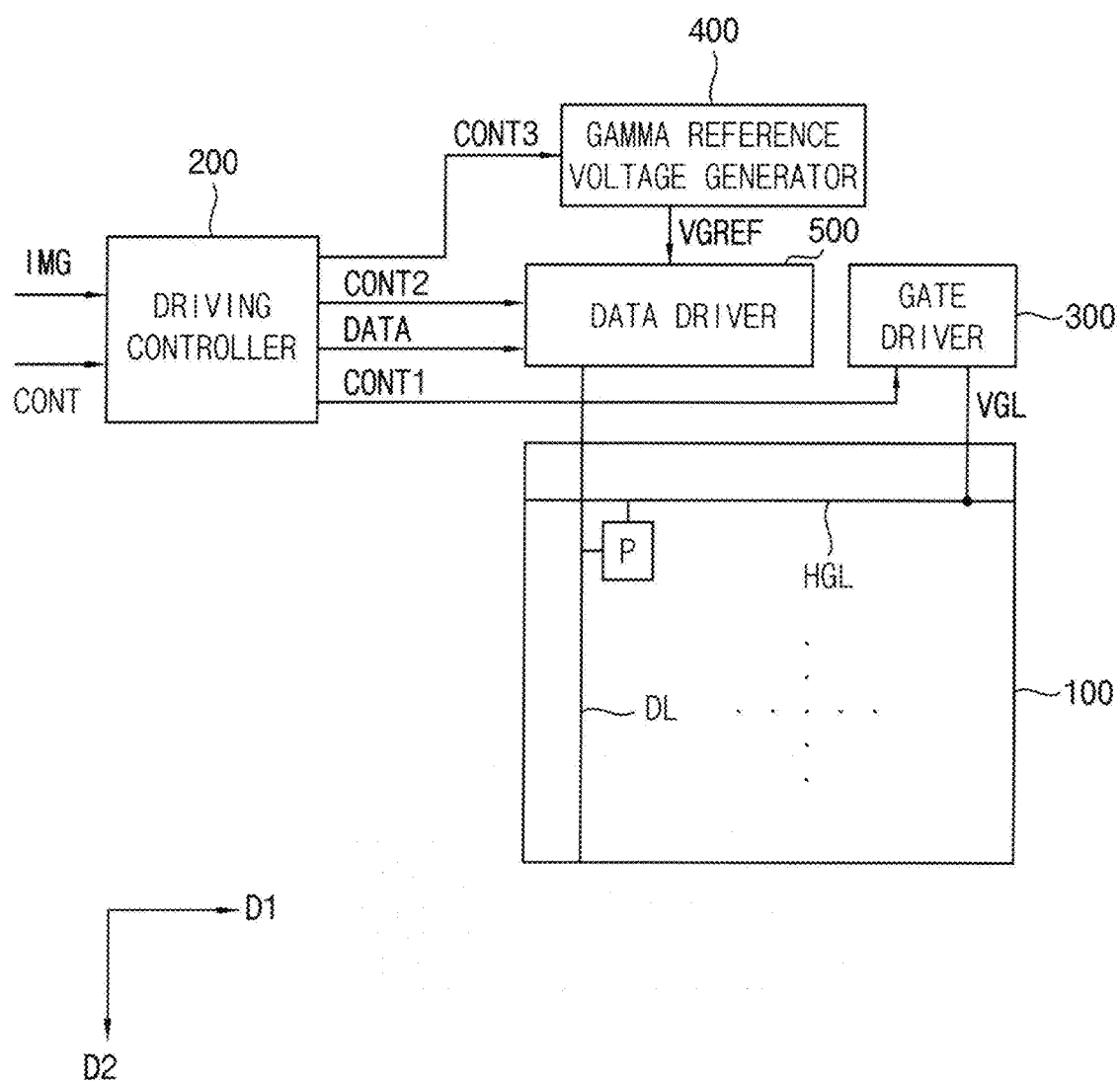
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

In an embodiment, for example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver ("TED").

The display panel 100 has a display region on which an image is displayed and a peripheral region adjacent to the display region.

The display panel 100 includes a plurality of gate lines HGL and VGL, a plurality of data lines DL and a plurality of pixels P electrically connected to the gate lines HGL and VGL and the data lines DL. The first-gate lines HGL may extend in a first direction D1, the second-gate lines VGL may extend in a second direction D2 crossing the first direction D1, and the data lines DL may extend in the second direction D2. The first-gate lines HGL and the second-gate lines VGL may be connected to each other. For example, the first-gate lines HGL and the second-gate lines VGL may be connected in a one-to-one manner. For example, the number of the first-gate lines HGL may be substantially the same as the number of the second-gate lines VGL. The first-gate lines HGL may be referred to horizontal gate lines. The second-gate lines VGL may be referred to vertical gate lines.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines HGL and VGL in response to the first control signal CONT1 received from the driving controller 200. The gate driver 300 outputs the gate signals to the gate lines HGL and VGL. For example, the gate driver 300 may sequentially output the gate signals to the gate lines HGL and VGL. The gate driver 300 may be disposed at the same side of the display panel 100 with the data driver 500 as shown in FIG. 1.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
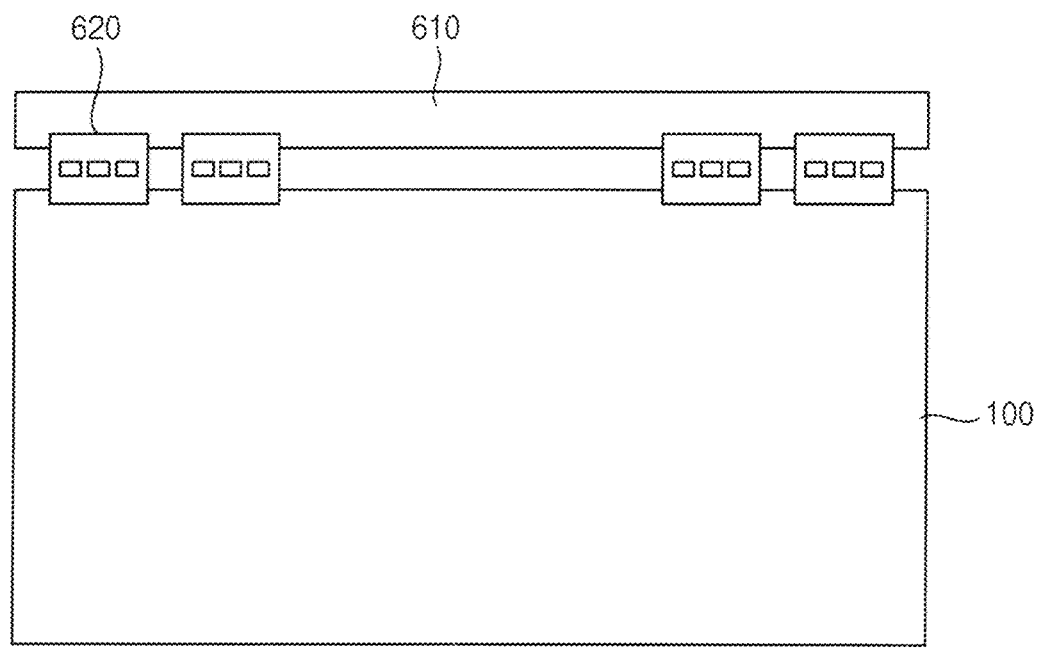
FIG. 2 is a plan view illustrating a display apparatus of FIG. 1.
Figure 3:
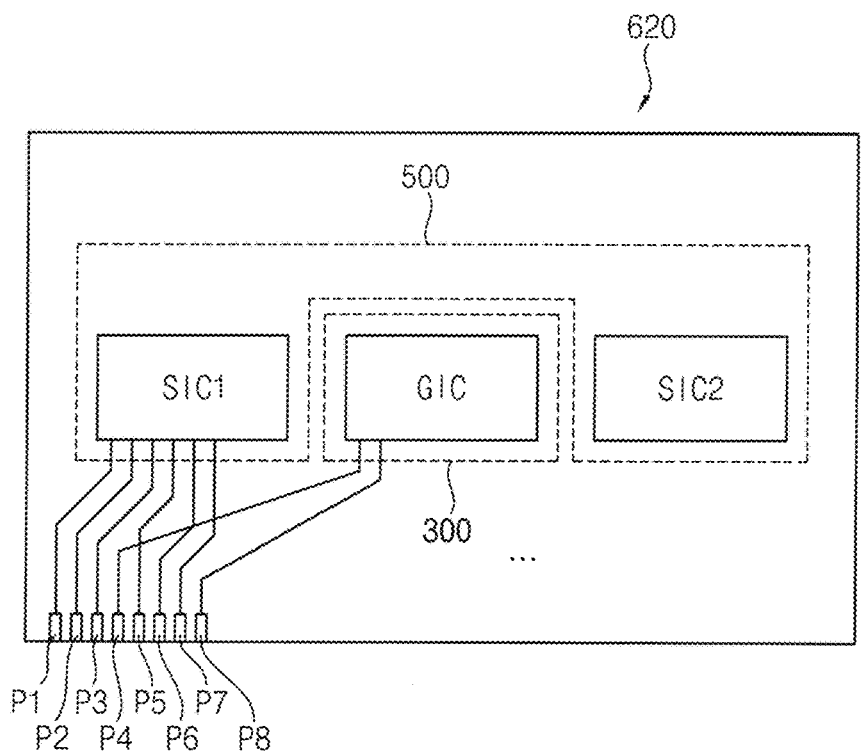
FIG. 3 is a plan view illustrating a flexible circuit substrate of FIG. 1.

FIG. 2 is a plan view illustrating a display apparatus of FIG. 1. FIG. 3 is a plan view illustrating a flexible circuit substrate of FIG. 1.

Referring to FIGS. 1 to 3, the display apparatus includes the display panel 100 and the display panel driver. The display panel driver may include a printed circuit board ("PCB") 610 and a plurality of flexible circuit substrates (flexible printed circuit boards, "FPC") 620.

A first side of the flexible circuit substrate 620 is connected to the display panel 100 and a second side of the flexible circuit substrate 620 is connected to the printed circuit board 610. The second side of the flexible circuit substrate 620 is opposite the first side.

The flexible circuit substrate 620 includes a flexible material. The flexible circuit substrate 620 may cover a side surface of the display panel 100. Thus, the printed circuit board 610 may be bended toward a rear surface of the display panel 100.

In an embodiment, for example, the flexible circuit substrate 620 may be disposed at one side of the display panel 100. The flexible circuit substrate 620 may be disposed at an upper side of the display panel 100.

One flexible circuit substrate 620 includes both a gate driving chip and a source driving chip. Thus, the gate driving chip and the source driving chip are disposed at a same side with respect to the display panel 100.

The printed circuit board 610 may include the driving controller 200.

As shown in FIG. 3, the gate driver 300 may include the gate driving chip GIC. The data driver 500 may include a first source driving chip SIC1 and a second source driving chips SIC2.

In an embodiment, for example, the first source driving chip SIC1, the gate driving chip GIC and the second source driving chip SIC2 may be sequentially disposed in the flexible circuit substrate 620. A line outputting the data voltage generated by the first source driving chip SIC1 and a line outputting the gate signal generated by the gate driving chip GIC may cross in the flexible circuit substrate 620.

In an embodiment, for example, first to third output signals of the first source driving chip SIC1 may be outputted through first to third pads P1, P2 and P3 of the flexible circuit substrate 620, respectively. A first output signal of the gate driving chip GIC may be outputted through a fourth pad P4 of the flexible circuit substrate 620. Fourth to sixth output signals of the first source driving chip SIC1 may be outputted through fifth to seventh pads P5, P6 and P7 of the flexible circuit substrate 620, respectively. A second output signal of the gate driving chip GIC may be outputted through an eighth pad P8.

Figure 4A:
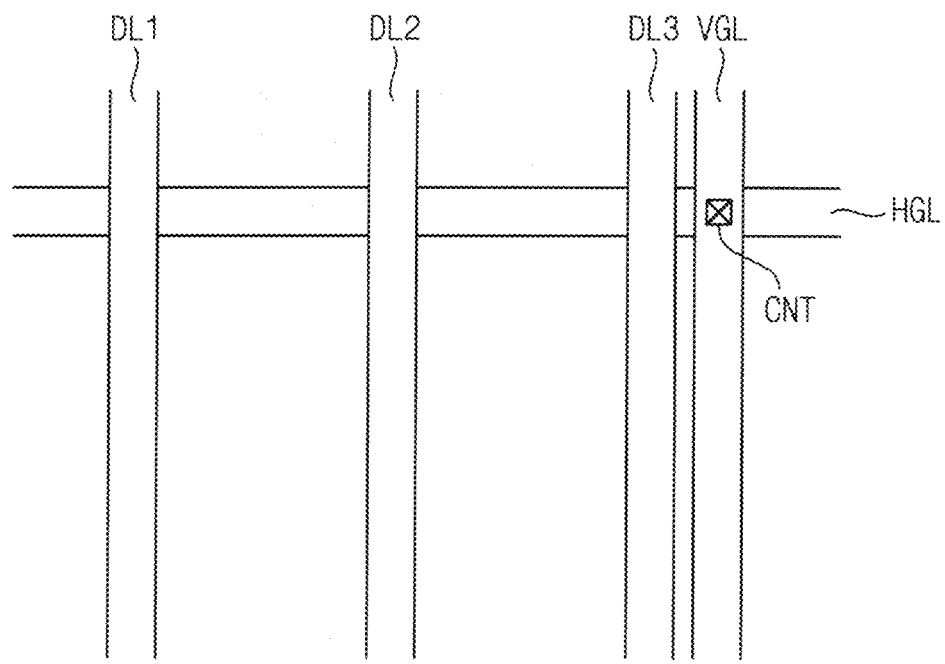
FIG. 4A is a plan view illustrating an example of a structure of gate lines and data lines of a display panel of FIG. 1.

FIG. 4A is a plan view illustrating an example of a structure of gate lines and data lines of the display panel 100 of FIG. 1.

Referring to FIGS. 1 to 4A, the first-gate lines HGL may be disposed on a first layer and the second-gate lines VGL and the data lines DL1, DL2 and DL3 may be disposed on a second layer different from the first layer.

The first-gate line HGL may be connected to the second-gate line VGL through a contact hole CNT.

In an embodiment, for example, three data lines DL1, DL2 and DL3 are disposed between two adjacent second-gate lines VGL.

Figure 4B:
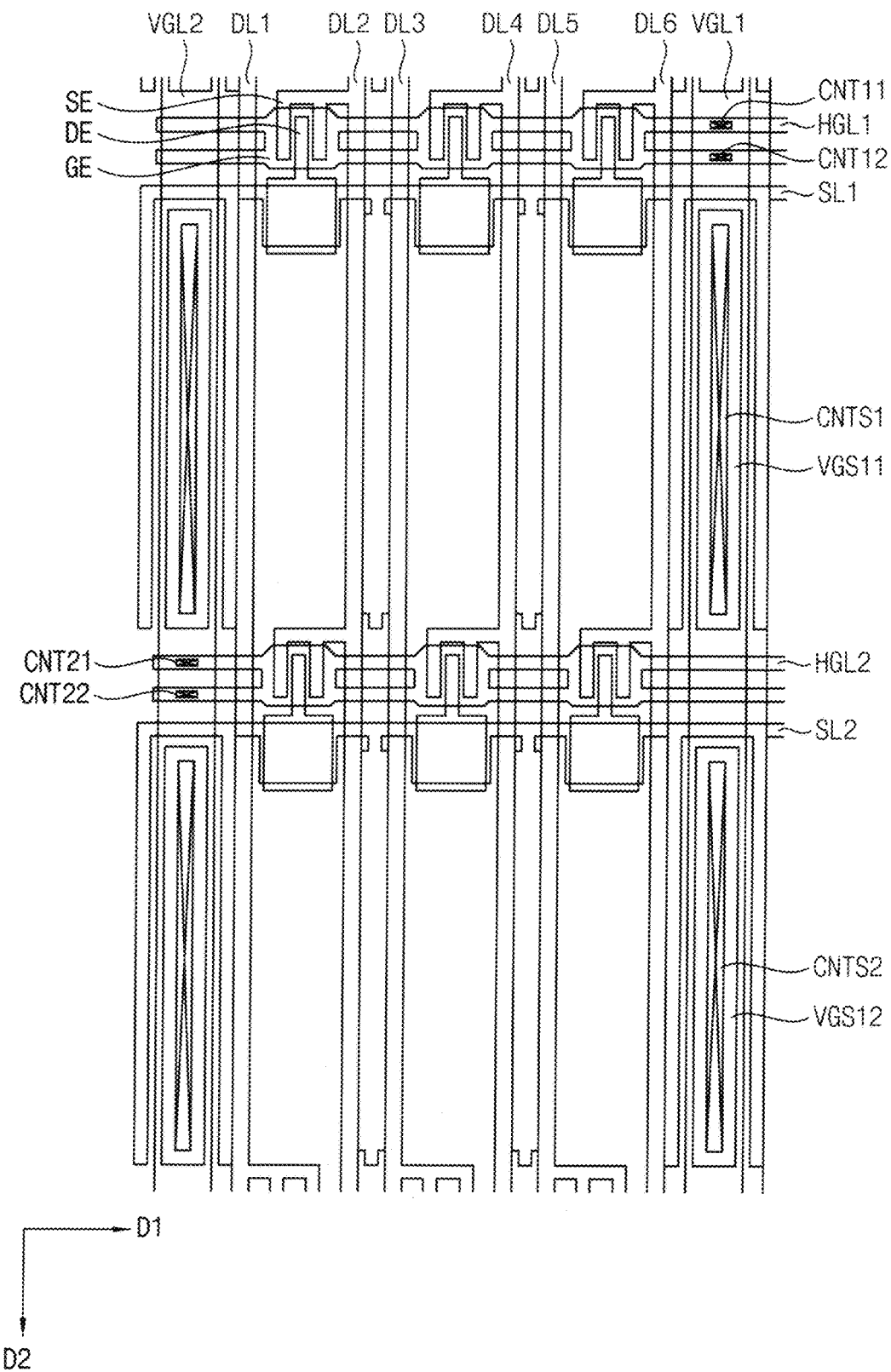
FIG. 4B is a plan view illustrating an example of a structure of the gate lines and the data lines of the display panel of FIG. 1.
Figure 4C:
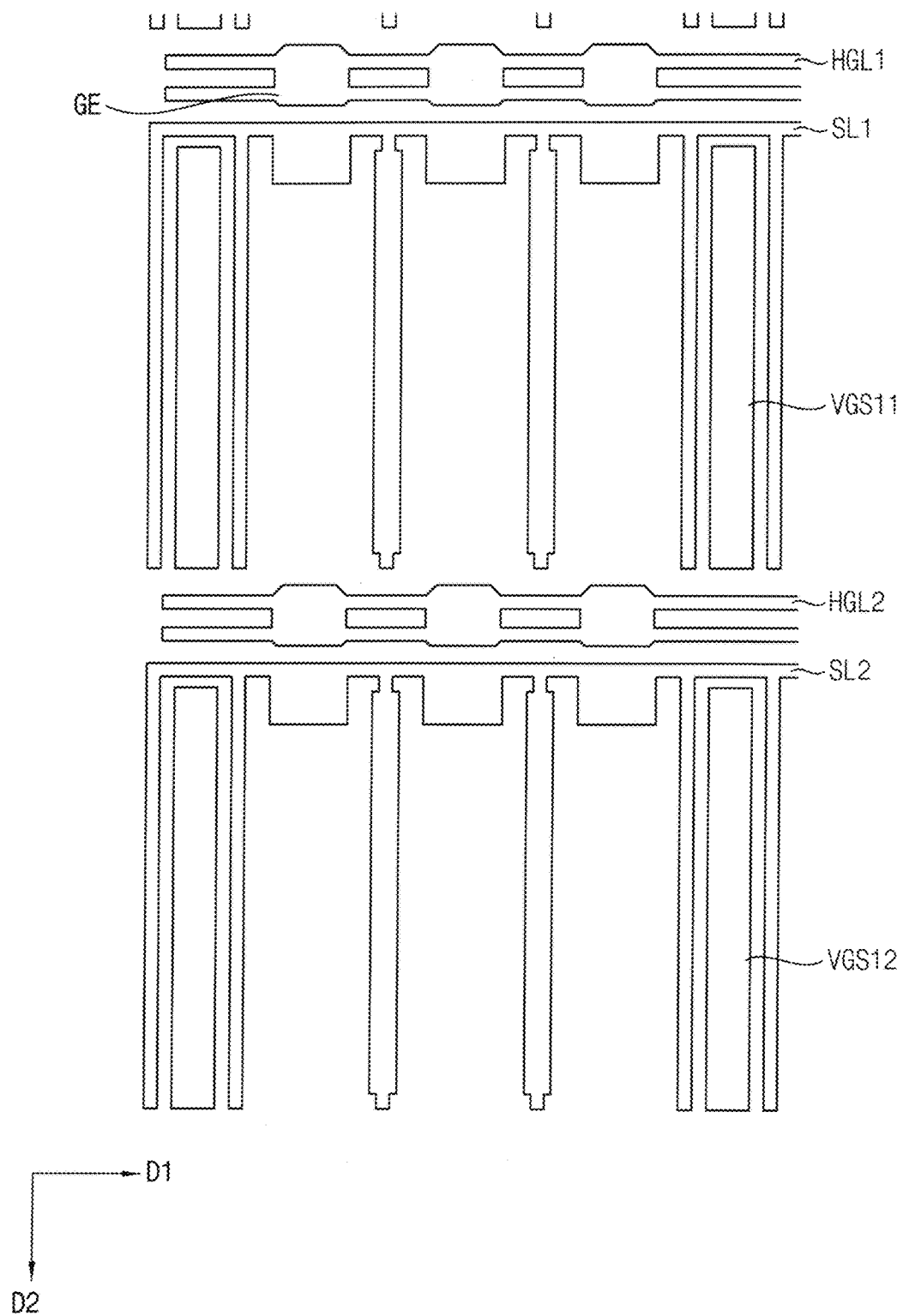
FIG. 4C is a plan view illustrating a first layer of the structure of the gate lines and the data lines of the display panel of FIG. 4B.
Figure 4D:
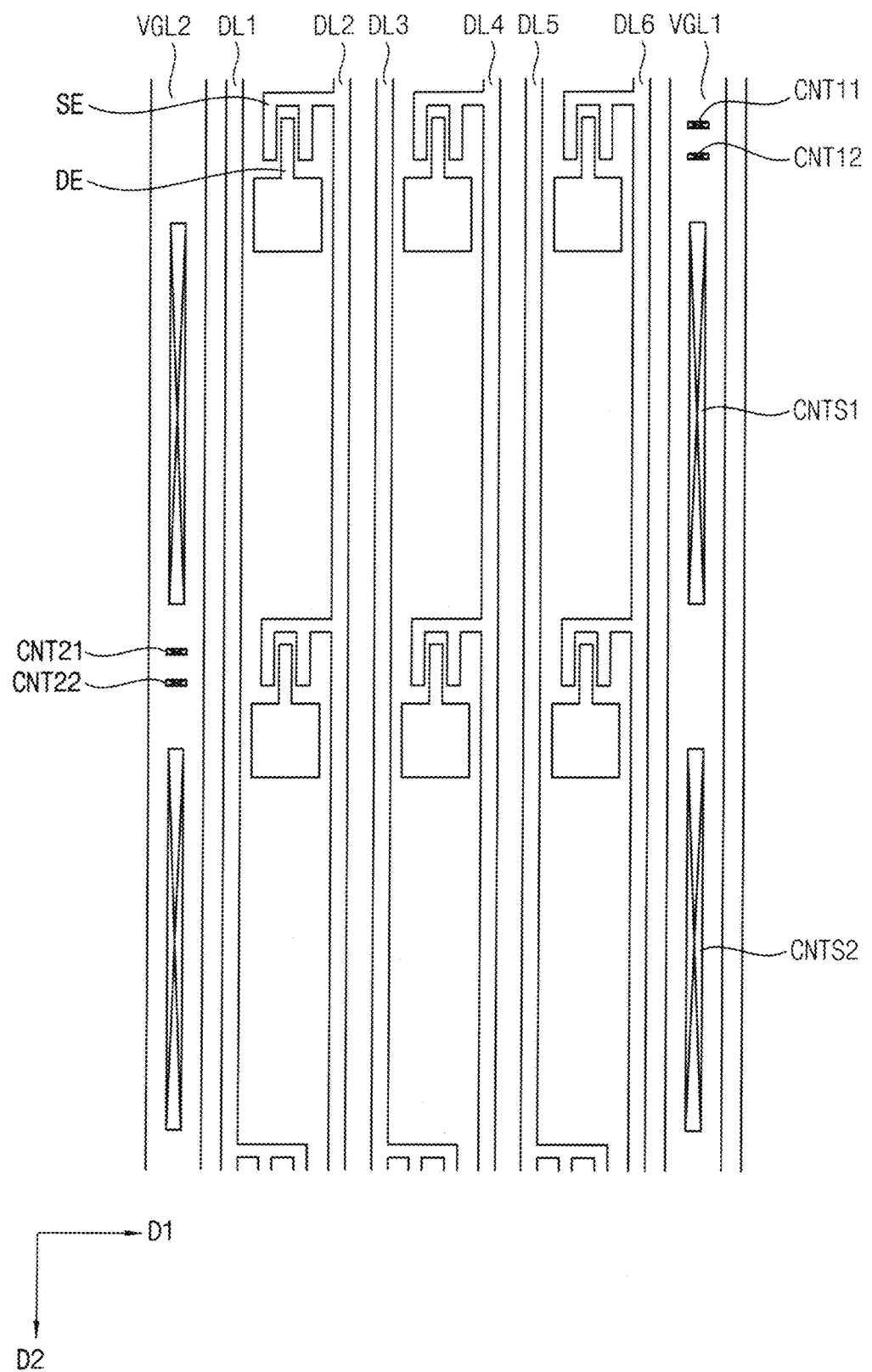
FIG. 4D is a plan view illustrating a second layer of the structure of the gate lines and the data lines of the display panel of FIG. 4B.

FIG. 4B is a plan view illustrating an example of a structure of the gate lines and the data lines of the display panel of FIG. 1. FIG. 4C is a plan view illustrating a first layer of the structure of the gate lines and the data lines of the display panel of FIG. 4B. FIG. 4D is a plan view illustrating a second layer of the structure of the gate lines and the data lines of the display panel of FIG. 4B.

Referring to FIGS. 1 to 3 and 4B to 4D, a first layer may be a gate metal layer in which a gate electrode of the pixel X is disposed, and a second layer may be a source-drain metal layer in which source-drain electrodes of the pixel X is disposed.

The first layer may include first-gate lines HGL1 and HGL2, storage lines SL1 and SL2, a gate electrode GE and second-gate sub electrodes VGS11 and VGS12. The first-gate lines HGL1 and HGL2 may extend in the first direction D1. The storage lines SL1 and SL2 may include an extension portion extended in the first direction D1 and a protrusion portion protruded from the extension portion in the second direction D2.

The second layer may include second-gate lines VGL1 and VGL2, data lines DL1 to DL6, a source electrode SE and a drain electrode DE. The second-gate lines VGL1 and VGL2 extend in the second direction D2. The data lines DL1 to DL6 extend in the second direction D2.

A first first-gate line HGL1 may connected to a first second-gate line VGL1 through first and second contact holes CNT11 and CNT12. For example, the first first-gate line HGL1 may include two branch portions. A first branch portion of the first first-gate line HGL1 may be connected to the first second-gate line VGL1 through the first contact hole CNT11. A second branch portion of the first first-gate line HGL1 may be connected to the first second-gate line VGL1 through the second contact hole CNT12.

In the same way, the second first-gate line HGL2 may be connected to a second second-gate line VGL2 through third and fourth contact holes CNT21 and CNT22.

The first second-gate line VGL1 may be connected to the second-gate sub electrodes VGS11 and VGS12 disposed on the first layer through sub contact holes CNTS1 and CNTS2, respectively. The second-gate line VLG1 is connected to the second-gate sub electrodes VGS11 and VGS12 through the sub contact holes CNTS1 and CNTS2 such that a wiring resistance of the second-gate line VGL1 may be reduced.

In the present embodiment in FIG. 4B, six data lines DL1 to DL6 may be disposed between two adjacent gate lines VGL1 and VGL2.

The gate electrode GE may be disposed in the first-gate lines HGL1 and HGL2. The source electrode SE may be protruded from the data lines DL1 to DL6 toward the gate electrode GE. The drain electrode DE is overlapped with the gate electrode GE in a plan view. The drain electrode DE is disposed adjacent to the source electrode SE. The gate electrode GE, the source electrode SE and the drain electrode DE may form a switching element of the display panel 100.

Figure 5:
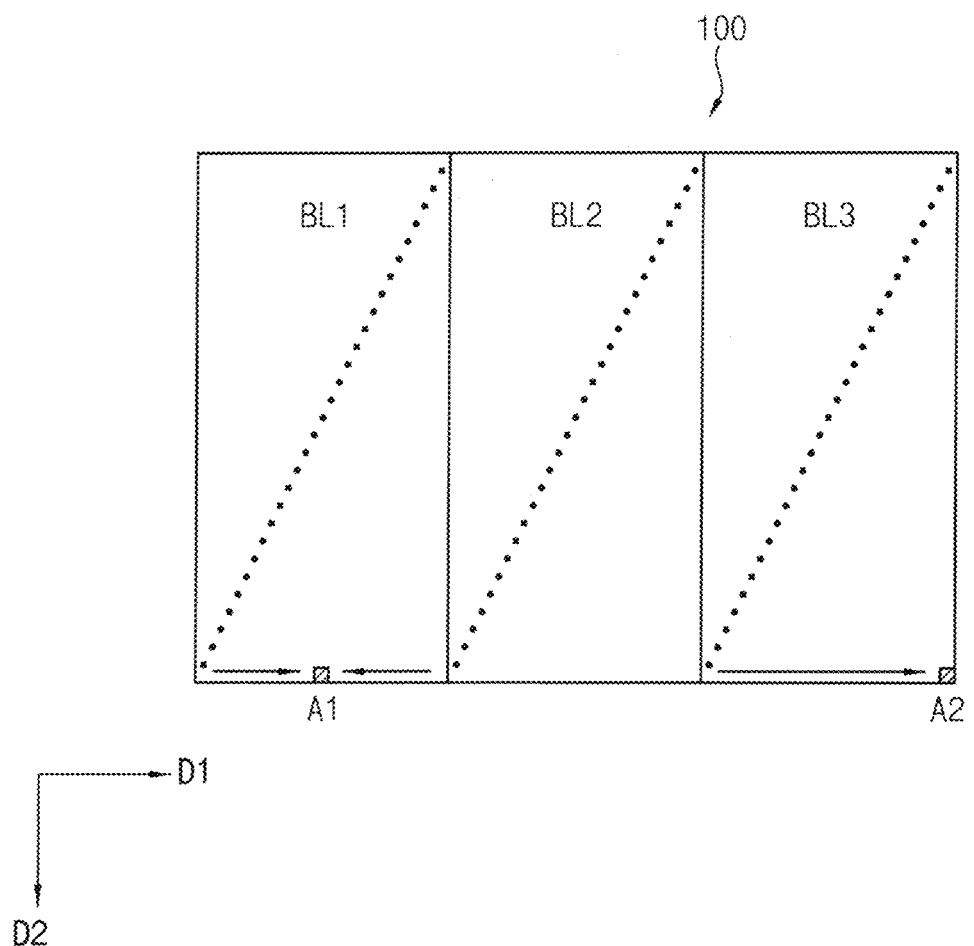
FIG. 5 is a schematic diagram illustrating connection between a first-gate line and a second-gate line of a display panel according to a comparative embodiment.
Figure 6:
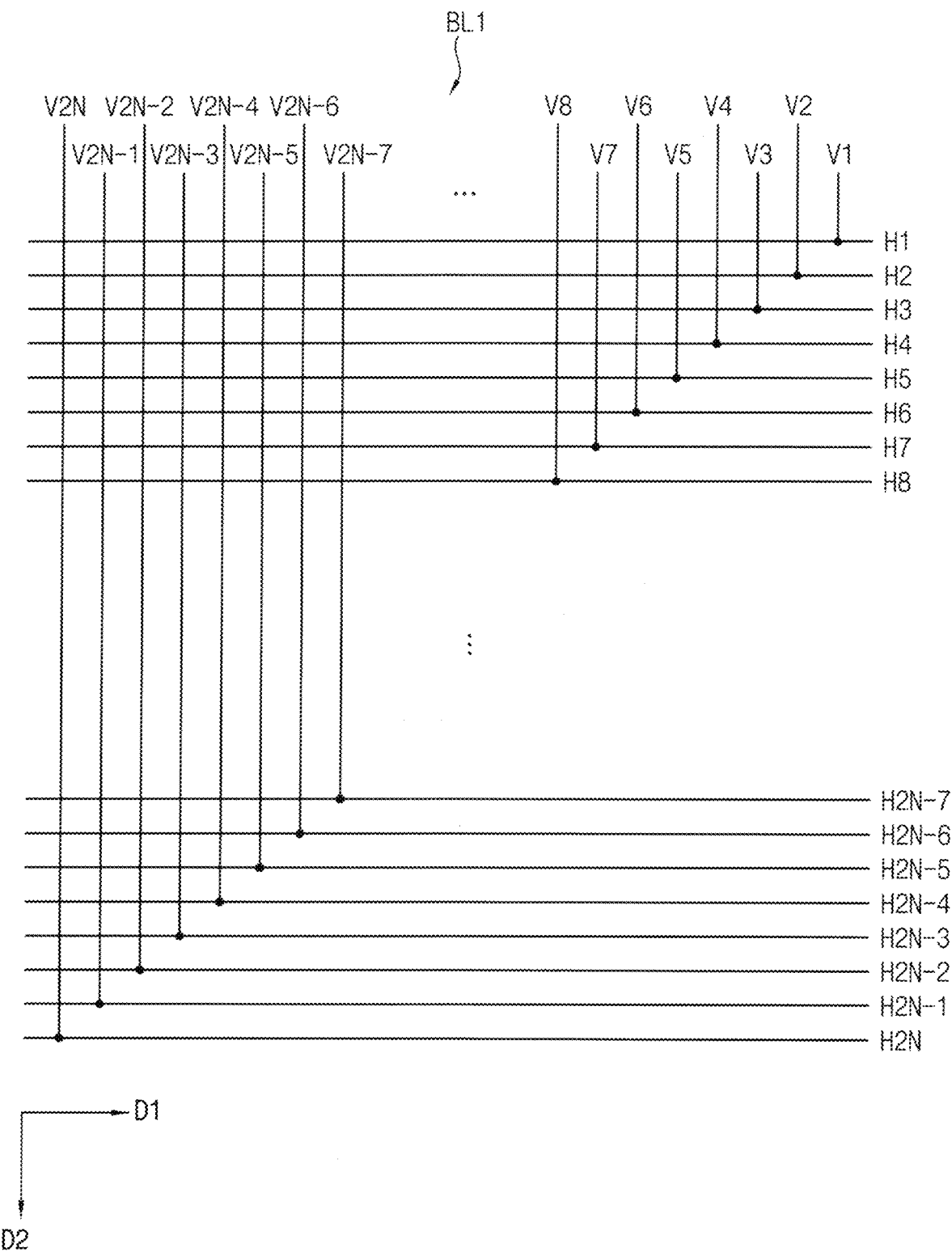
FIG. 6 is a detailed diagram illustrating the connection between the first-gate line and the second-gate line of the display panel of FIG. 5.

FIG. 5 is a schematic diagram illustrating connection between a first-gate line and a second-gate line of a display panel according to a comparative embodiment. FIG. 6 is a detailed diagram illustrating the connection between the first-gate line and the second-gate line of the display panel of FIG. 5.

The display panel according to the comparative embodiment of FIG. 5 may include a first block BL1, a second block BL2 and a third block BL3. The first-gate lines H1 to H2N may be connected to the corresponding second-gate lines V1 to V2N one-to-one in the block (e.g., BL1). Herein, the number of the gate lines may be 2N in total. For example, the first-gate lines H1 to H2N may be connected to the second-gate lines V1 to V2N, respectively, as shown in FIG. 6

In FIG. 5, connecting points between the first-gate lines H1 to H2N and the corresponding second-gate lines V1 to V2N are represented as circular dots. In each block of FIG. 5, a line connecting the circular dots where the first-gate lines H1 to H2N and the corresponding second-gate lines V1 to V2N are connected may be illustrated a single diagonal line.

A propagation delay of a gate signal transmitted to a first position A1 which is a bottom center position in the first block BL1 may be a sum of a propagation delay corresponding to a height of the display panel 100 in the second direction D2 and a propagation delay corresponding to a half of a width of the first block BL1 in the first direction D1. Due to the propagation delay of the gate signal transmitted to the first position A1, a charging rate of the pixel disposed at the first position A1 may be decreased and a stain may be generated at the first position A1.

A propagation delay of a gate signal transmitted to a second position A2 which is a bottom rightmost position in the third block BL3 may be a sum of a propagation delay corresponding to the height of the display panel 100 in the second direction D2 and a propagation delay corresponding to a width of the third block BL3 in the first direction D1. The propagation delay of the gate signal transmitted to the second position A2 may be a worst case of a structure of FIG. 5. Due to the propagation delay of the gate signal transmitted to the second position A2, a charging rate of the pixel disposed at the second position A2 may be decreased, and a stain may be generated at the second position A2.

Figure 7:
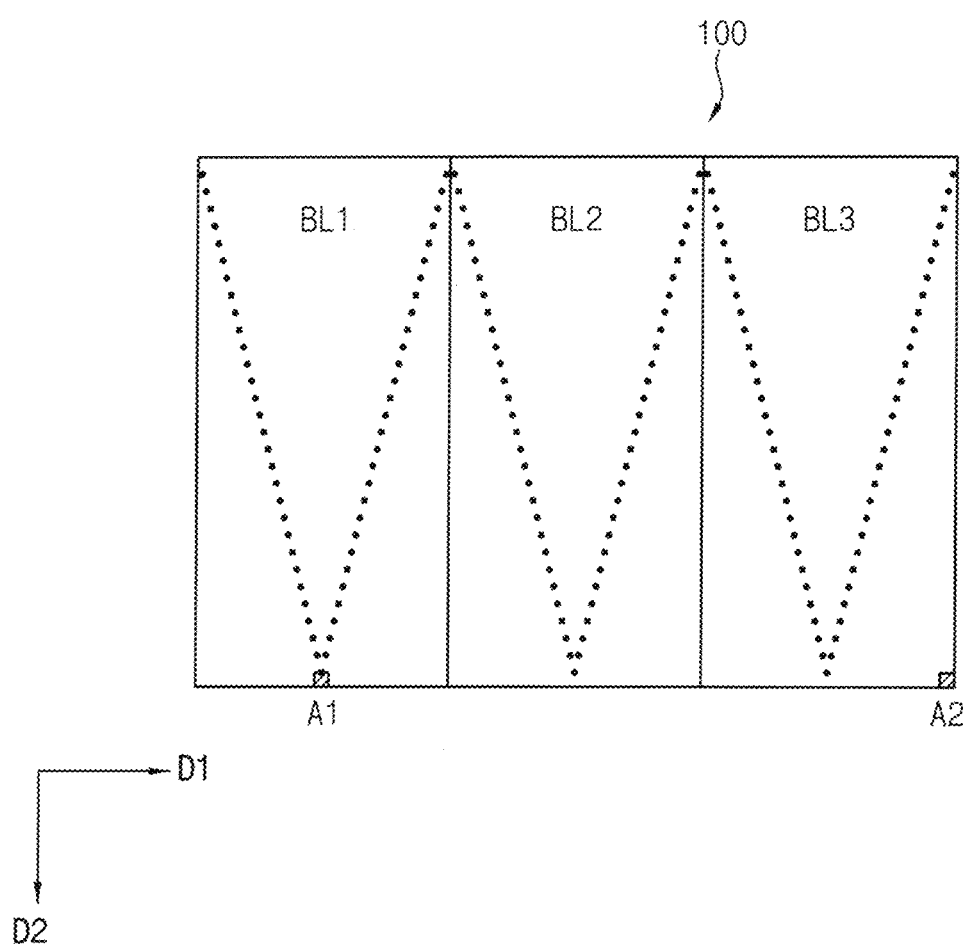
FIG. 7 is a schematic diagram illustrating connection between a first-gate line and a second-gate line of the display panel of FIG. 1.
Figure 8:
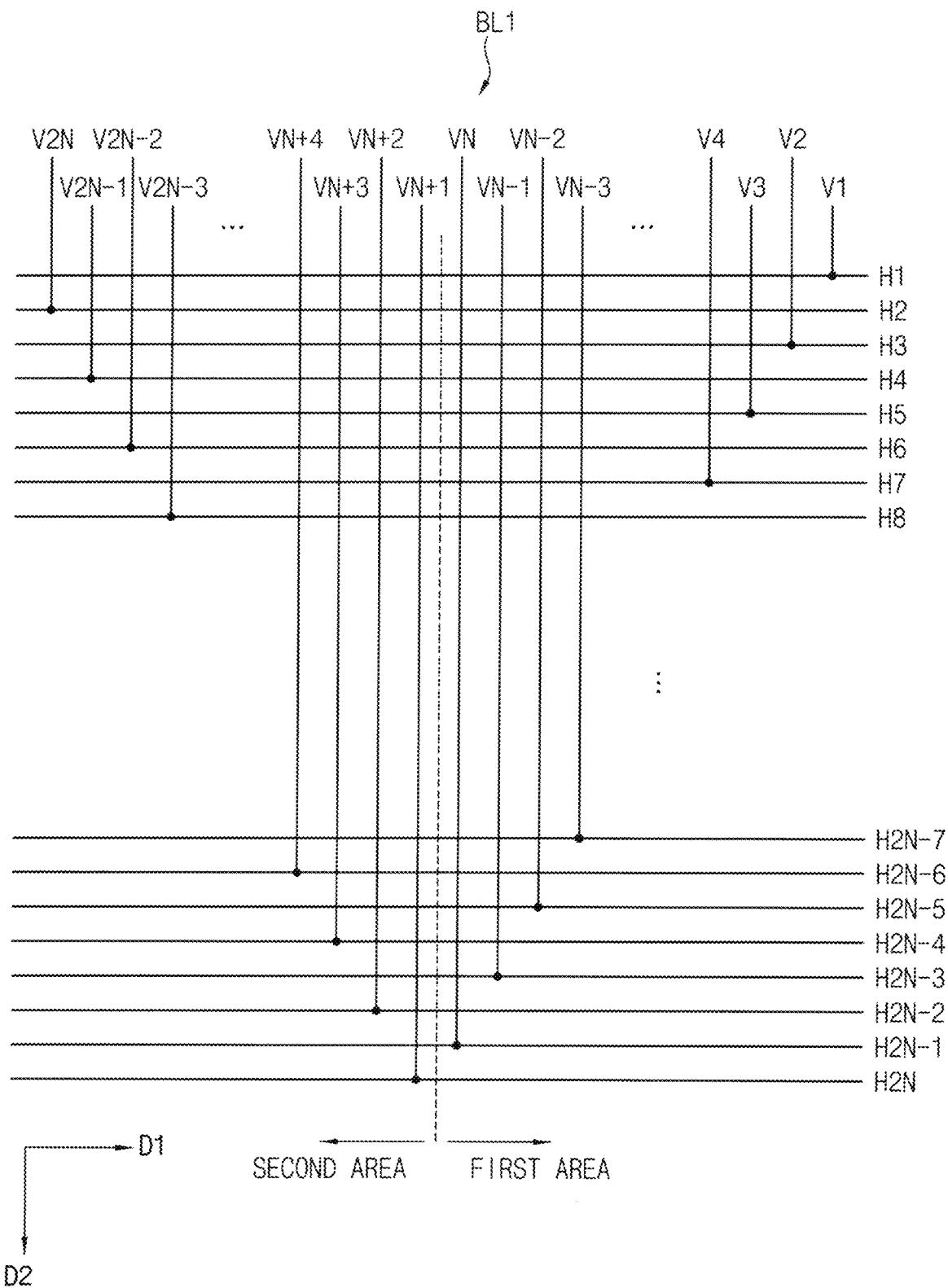
FIG. 8 is a detailed diagram illustrating the connection between the first-gate line and the second-gate line of FIG. 7.

FIG. 7 is a schematic diagram illustrating connection between a first-gate line and a second-gate line of the display panel 100 of FIG. 1. FIG. 8 is a detailed diagram illustrating the connection between the first-gate line and the second-gate line of FIG. 7.

Referring to FIGS. 1 to 4D, 7 and 8, the display panel 100 may include a first block BL1, a second block BL2 and a third block BL3. Although the display panel 100 includes three blocks BL1, BL2 and BL3 in the present embodiment, the present inventive concept may not be limited to this number of the blocks.

In the first block BL1, the first-gate lines H1 to H2N may be connected to the corresponding second-gate lines V1 to V2N in a one-to-one manner. In the second block BL2 similar to the first block BL1, the first-gate lines H1 to H2N may be connected to the corresponding second-gate lines V1 to V2N one-to-one. In the third block BL3 similar to the first block BL1 and the second block BL2, the first-gate lines H1 to H2N may be connected to the corresponding second-gate lines V1 to V2N one-to-one. In each block, each of the first-gate lines H1 to H2N may be connected to corresponding one of the second-gate lines V1 to V2N. Herein, the number of the first-gate lines may be 2N in total.

In FIG. 7, connecting points between the first-gate lines H1 to H2N and the corresponding second-gate lines V1 to V2N are represented as circular dots. In FIG. 7, each of the blocks BL1, BL2 and BL3 may be divided into two areas.

In FIG. 8, the second-gate lines (e.g., V1 to VN) disposed in a first area of the block (e.g., BL1) may be connected to odd numbered first-gate lines H1, H3, H5, H7, . . . , H2N−7, H2N−5, H2N−3 and H2N−1 among the first-gate lines one-to-one. In FIG. 8, the second-gate lines (e.g., VN+1 to V2N) disposed in a second area of the block (e.g., BL1) may be connected to even numbered first-gate lines H2, H4, H6, H8, . . . , H2N−6, H2N−4, H2N−2 and H2N among the first-gate lines one-to-one. The second area of the block (e.g., BL1) is adjacent to the first area of the block (e.g., BL1) in the first direction D1. The first area may be a right half area of the block in which the second-gate lines V1 to VN are disposed, and the second area may be a left half area of the block in which the second-gate lines VN+1 to V2N are disposed.

In each block of FIG. 7, a first line (i.e., a first virtual line) connecting the circular dots where the first-gate lines and the corresponding second-gate lines are connected in the first area and a second line (i.e., a second virtual line) connecting the circular dots where the first-gate lines and the corresponding second-gate lines are connected in the second area may form a V-shape.

In an embodiment, for example, in FIG. 8, a first second-gate line V1 may be connected to a first first-gate line H1, a second second-gate line V2 may be connected to a third first-gate line H3, an N−1-th second-gate line VN−1 may be connected to a 2N−3-th first-gate line H2N−3 and an N-th second-gate line VN may be connected to a 2N−1-th first-gate line H2N−1 in the first area. An N+1-th second-gate line VN+1 may be connected to a 2N-th first-gate line H2N, an N+2-th second-gate line VN+2 may be connected to a 2N−2-th first-gate line H2N−2, a 2N−1-th second-gate line V2N−1 may be connected to a fourth first-gate line H4 and a 2N-th second-gate line V2N may be connected to a second first-gate line H2 in the second area.

Although the first area is disposed in a left side in the block (e.g., BL1) and the second area is disposed in a right side in the block (e.g., BL1), the present inventive concept may not be limited thereto.

In the present embodiment, a propagation delay of a gate signal transmitted to a first position A1 which is a bottom center position in the first block BL1 may be a propagation delay corresponding to a height of the display panel 100 in the second direction D2. Thus, the propagation delay of the gate signal transmitted to the first position A1 in the present embodiment may be reduced compared to the propagation delay of the gate signal transmitted to the first position A1 of the comparative embodiment of FIGS. 5 and 6.

In the present embodiment, a propagation delay of a gate signal transmitted to a second position A2 which is a bottom rightmost position in the third block BL3 may be a sum of a propagation delay corresponding to the height of the display panel 100 in the second direction D2 and a propagation delay corresponding to a half of the width of the third block BL3 in the first direction D1. Thus, the propagation delay of the gate signal transmitted to the second position A2 in the present embodiment may be reduced compared to the propagation delay of the gate signal transmitted to the second position A2 of the comparative embodiment of FIGS. 5 and 6.

Figure 9:
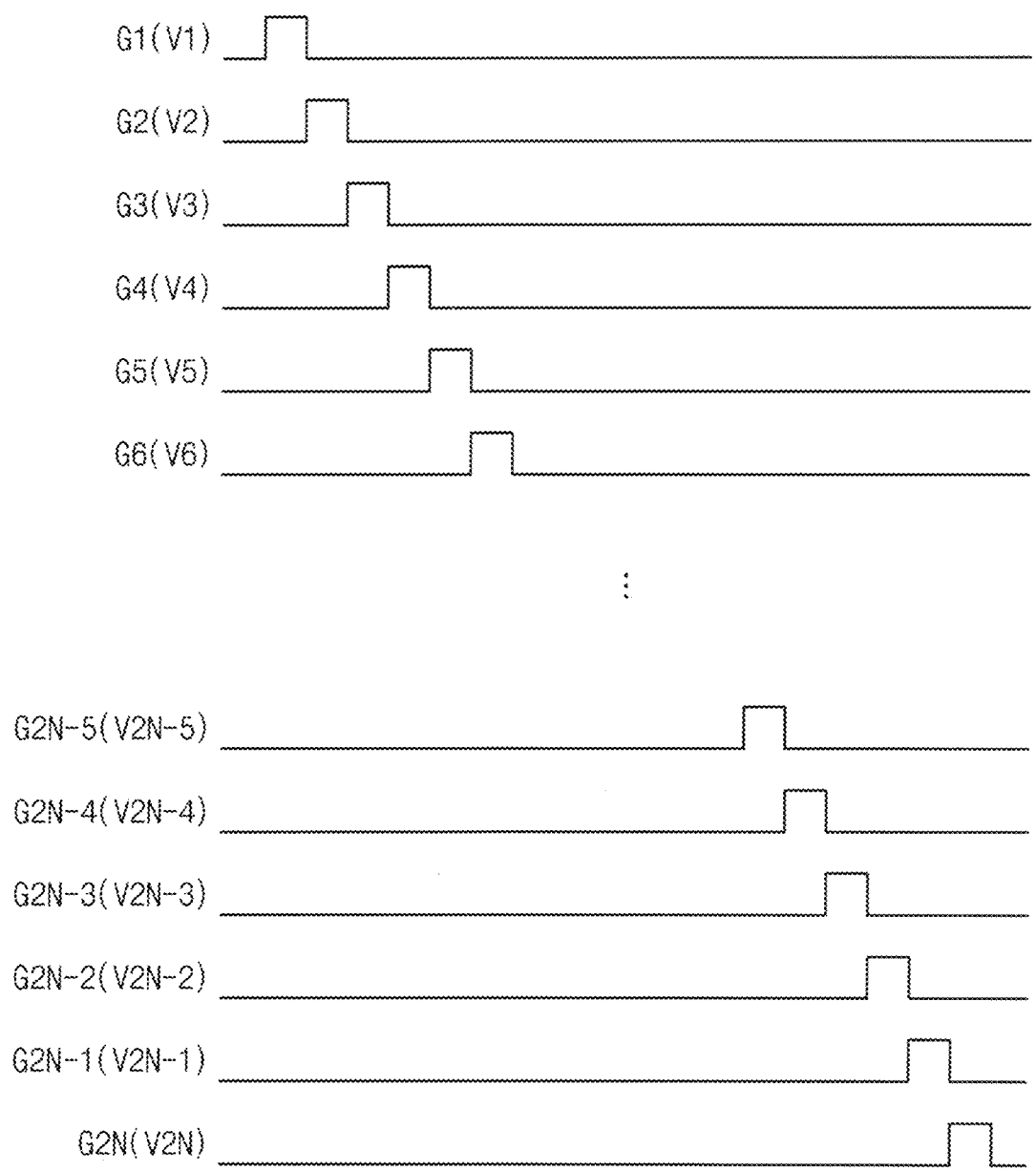
FIG. 9 is a timing diagram illustrating an example of gate signals applied to the second-gate lines of FIG. 8.

FIG. 9 is a timing diagram illustrating an example of gate signals applied to the second-gate lines of FIG. 8.

Referring to FIGS. 7 to 9, when the gate signals G1 to G2N are sequentially applied to the first second-gate line V1 of FIG. 8 to the 2N-th second-gate line of FIG. 8, the odd numbered first-gate lines H1, H3, H5, H7, H2N−7, . . . , H2N−5, H2N−3 and H2N−1 in the first area (e.g., right-half area) may be scanned during the first subframe, and the even numbered first-gate lines H2, H4, H6, H8, . . . , H2N−6, H2N−4, H2N−2 and H2N in the second area (e.g., left-half area) may be scanned during the second subframe after the first subframe. When the gate signals G1 to G2N are sequentially applied to the first second-gate line V1 of FIG. 8 to the 2N-th second-gate line of FIG. 8, the display panel 100 may be driven in an interlace driving method.

Figure 10:
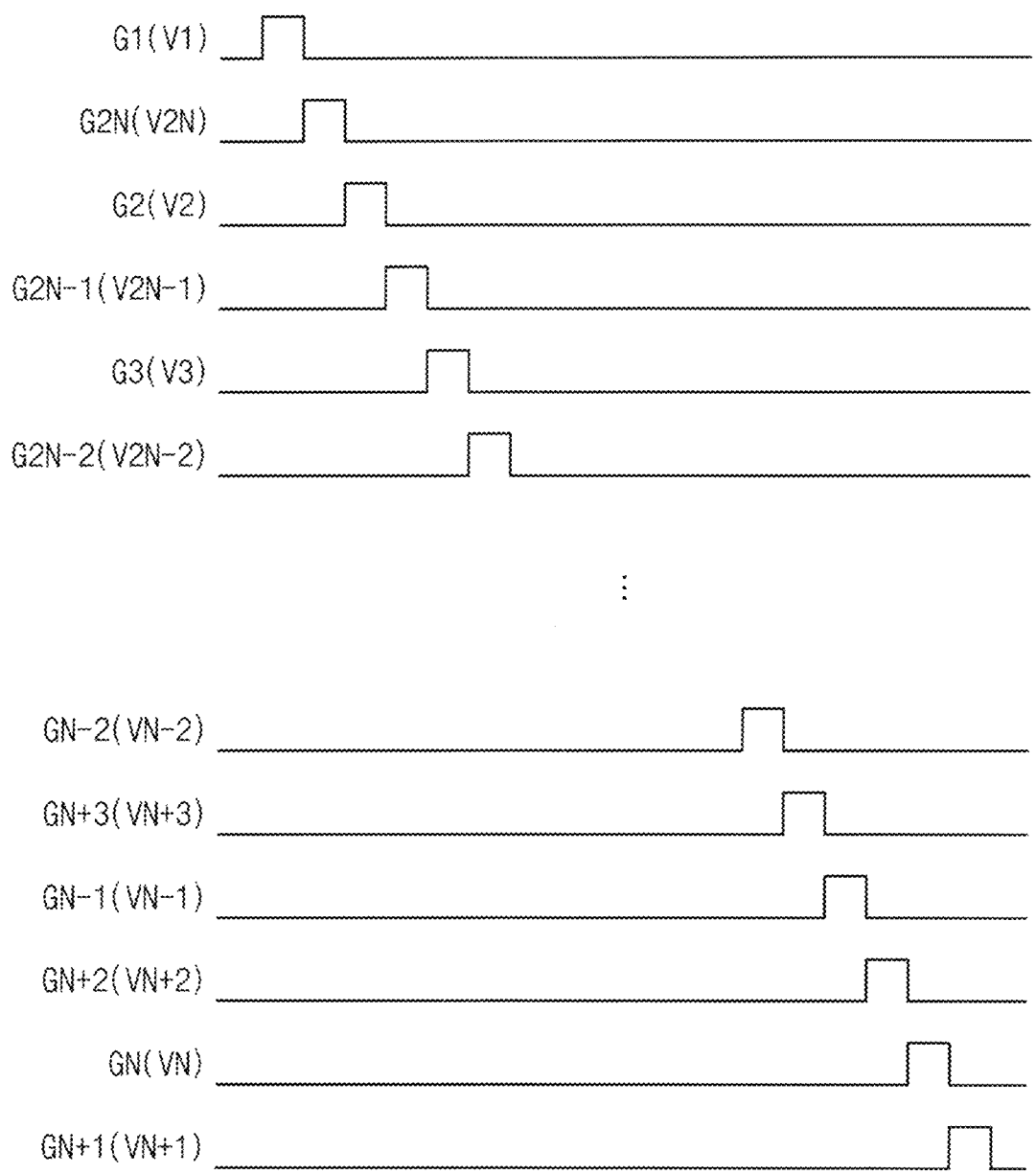
FIG. 10 is a timing diagram illustrating another example of gate signals applied to the second-gate lines of FIG. 8.

FIG. 10 is a timing diagram illustrating another example of gate signals applied to the second-gate lines of FIG. 8.

Referring to FIGS. 7, 8 and 10, the gate signals G1 to G2N may be alternately applied to the second-gate line V1 to VN in the first area and the second-gate line VN+1 to V2N in the second area. When the gate signals G1 to G2N are alternately applied to the second-gate line V1 to VN in the first area and the second-gate line VN+1 to V2N in the second area, the first-gate lines H1 to H2N in the block (e.g., BL1) may be sequentially scanned. When the first-gate lines H1 to H2N in the block (e.g., BL1) are sequentially scanned, it is referred to a progressive driving method.

As shown in FIG. 10, for example, a first pulse may be output to the first second-gate line V1 which is connected to the first first-gate line H1, a second pulse may be output to the 2N-th second-gate line V2N which is connected to the second first-gate line H2, a third pulse may be output to the second second-gate line V2 which is connected to the third first-gate line H3 and a fourth pulse may be output to the 2N−1-th second-gate line V2N−1 which is connected to the fourth first-gate line H4.

According to an embodiment, the gate driver 300 and the data driver 500 are disposed at one side of the display panel 100 such that the bezel width of the side portion of the display panel 100 may be reduced.

In addition, the odd-numbered first-gate lines H1 to H2N−1 and the second-gate lines V1 to VN are connected one-to-one in the first area (e.g., right half) of the block (e.g., BL1) of the display panel 100 and the even-numbered first-gate lines H2 to H2N and the second-gate lines VN+1 to V2N are connected one-to-one in the second area of the block (e.g., BL1) such that the propagation delay of the gate signal at a bottom side portion of the display panel 100 may be reduced. Thus, the display quality of the display panel 100 may be enhanced.

Figure 11:
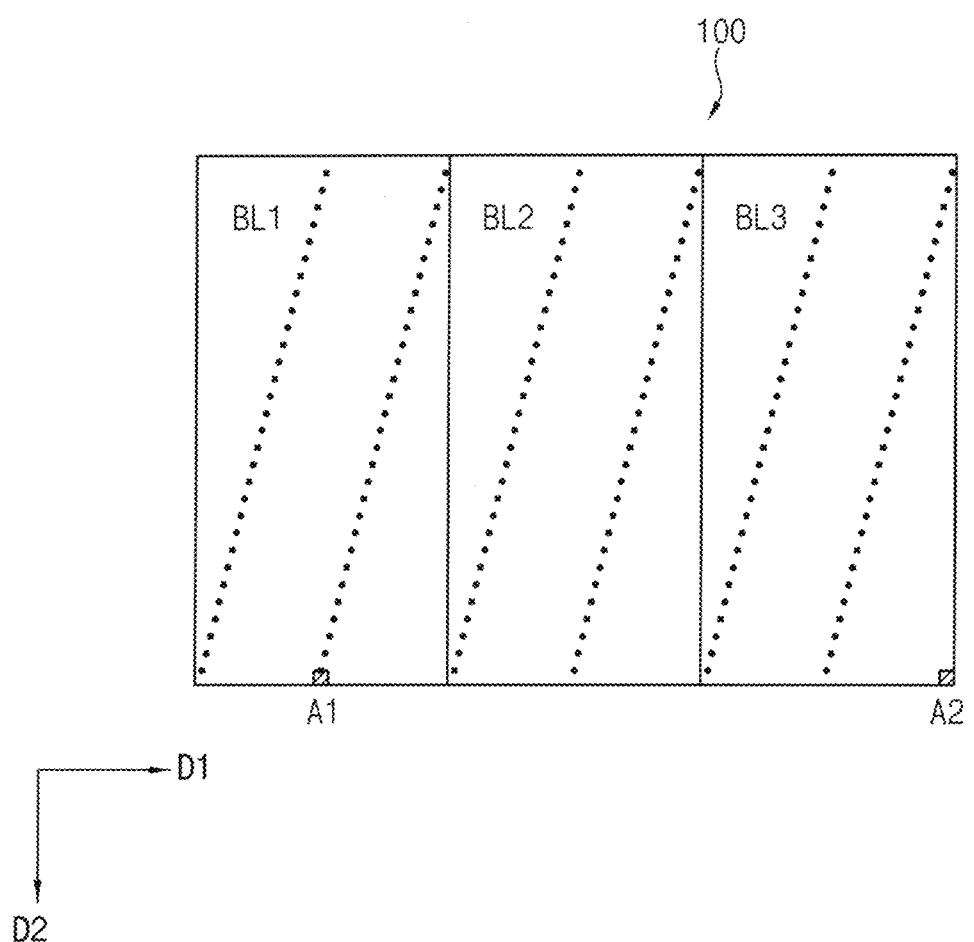
FIG. 11 is a schematic diagram illustrating connection between a first-gate line and a second-gate line of a display panel according to an embodiment of the present inventive concept.
Figure 12:
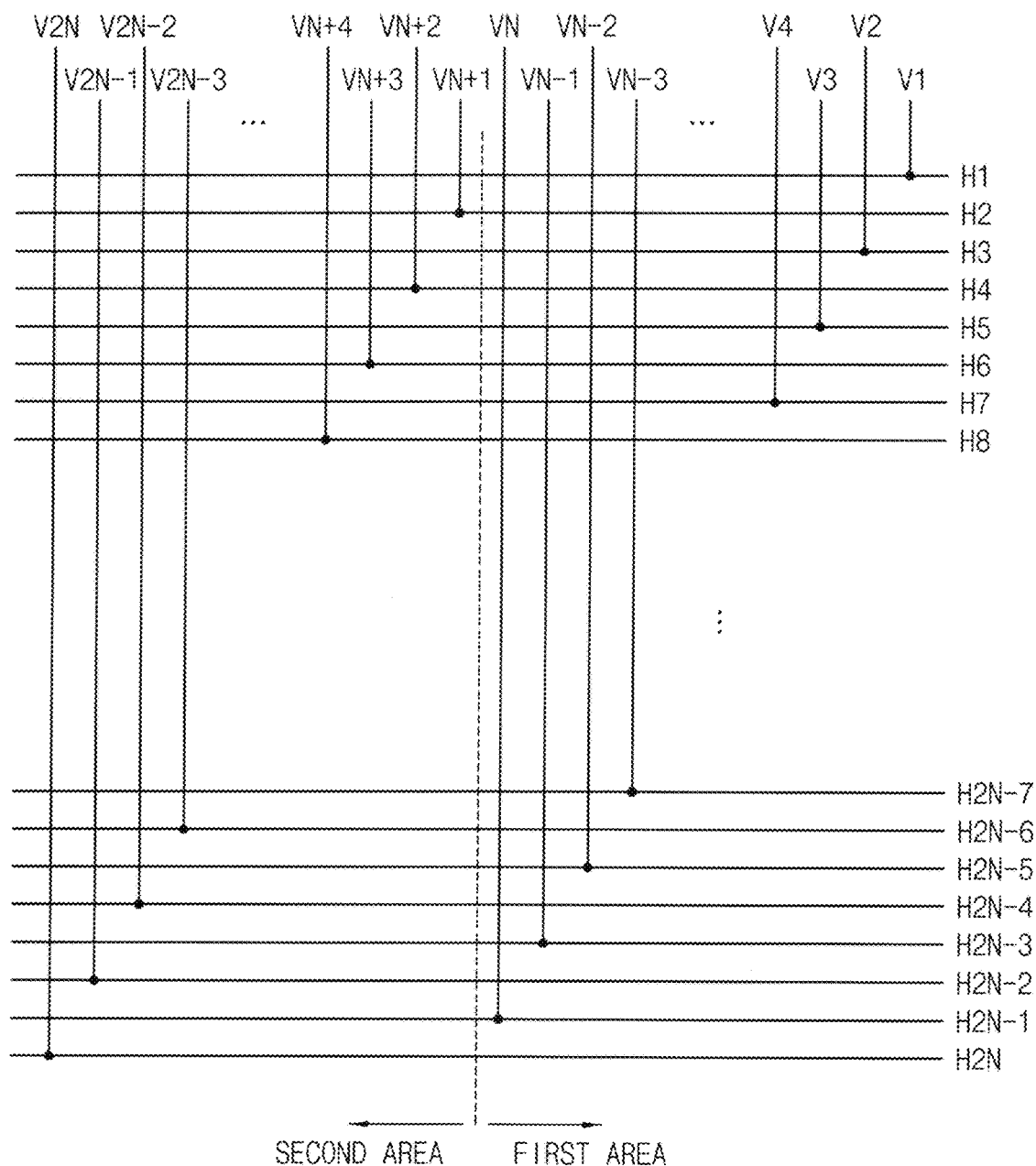
FIG. 12 is a detailed diagram illustrating the connection between the first-gate line and the second-gate line of FIG. 11.

FIG. 11 is a schematic diagram illustrating connection between a first-gate line and a second-gate line of a display panel according to an embodiment of the present inventive concept. FIG. 12 is a detailed diagram illustrating the connection between the first-gate line and the second-gate line of FIG. 11.

The display panel, the display apparatus and the method of driving the display panel according to the present embodiment is substantially the same as the display panel, the display apparatus and the method of driving the display panel of the previous embodiment explained referring to FIGS. 1 to 10 except for the connection structure between the first-gate lines and the second-gate lines. Thus, the same reference numerals will be used to refer to the same or like parts as those described in the previous embodiment of FIGS. 1 to 10 and any repetitive explanation concerning the above elements will be omitted.

Referring to FIGS. 1 to 4D, 11 and 12, the display apparatus includes a display panel 100 and a display panel driver. The display panel driver includes a driving controller 200, a gate driver 300, a gamma reference voltage generator 400 and a data driver 500.

The display panel 100 may include a first block BL1, a second block BL2 and a third block BL3. Although the display panel 100 includes three blocks BL1, BL2 and BL3 in the present embodiment, the present inventive concept may not be limited to this number of the blocks.

In FIG. 11, connecting points between the first-gate lines H1 to H2N and the corresponding second-gate lines V1 to V2N are represented as circular dots. In FIG. 11, each of the blocks BL1, BL2 and BL3 may be divided into two areas.

In FIG. 12, the second-gate lines (e.g., V1 to VN) disposed in a first area of the block (e.g., BL1) may be connected to odd numbered first-gate lines H1, H3, H5, H7, . . . , H2N−7, H2N−5, H2N−3 and H2N−1 among the first-gate lines in a one-to-one manner. In FIG. 12, the second-gate lines (e.g., VN+1 to V2N) disposed in a second area of the block (e.g., BL1) may be connected to even numbered first-gate lines H2, H4, H6, H8, . . . , H2N−6, H2N−4, H2N−2 and H2N among the first-gate lines one-to-one. The second area of the block (e.g., BL1) is adjacent to the first area of the block (e.g., BL1) in the first direction D1. Herein, the number of the first-gate lines may be 2N in total.

In each block of FIG. 11, a first line (i.e., a first virtual line) connecting the circular dots where the first-gate lines and the corresponding second-gate lines are connected in the first area (e.g., right-half of a block) and a second line (i.e., a second virtual line) connecting the circular dots where the first-gate lines and the corresponding second-gate lines are connected in the second area (e.g., left-half of a block) may be parallel to each other.

In an embodiment, for example, in FIG. 12, a first second-gate line V1 may be connected to a first first-gate line H1, a second second-gate line V2 may be connected to a third first-gate line H3, an N−1-th second-gate line VN−1 may be connected to a 2N−3-th first-gate line H2N−3, and an N-th second-gate line VN may be connected to a 2N−1-th first-gate line H2N−1 in the first area. An N+1-th second-gate line VN+1 may be connected to a second first-gate line H2, an N+2-th second-gate line VN+2 may be connected to a fourth first-gate line H4, a 2N−1-th second-gate line V2N−1 may be connected to a 2N−2-th first-gate line H2N−2, and a 2N-th second-gate line V2N may be connected to a 2N-th first-gate line H2N in the second area.

Although the first area is disposed in a left side in the block (e.g., BL1) and the second area is disposed in a right side in the block (e.g., BL1), the present inventive concept may not be limited thereto.

In the present embodiment, a propagation delay of a gate signal transmitted to a first position A1 which is a bottom center position in the first block BL1 may be a propagation delay corresponding to a height of the display panel 100 in the second direction D2. Thus, the propagation delay of the gate signal transmitted to the first position A1 in the present embodiment may be reduced compared to the propagation delay of the gate signal transmitted to the first position A1 of the comparative embodiment of FIGS. 5 and 6.

In the present embodiment, a propagation delay of a gate signal transmitted to a second position A2 which is a bottom rightmost position in the third block BL3 may be a sum of a propagation delay corresponding to the height of the display panel 100 in the second direction D2 and a propagation delay corresponding to a half of the width of the third block BL3 in the first direction D1. Thus, the propagation delay of the gate signal transmitted to the second position A2 in the present embodiment may be reduced compared to the propagation delay of the gate signal transmitted to the second position A2 of the comparative embodiment of FIGS. 5 and 6.

Figure 13:
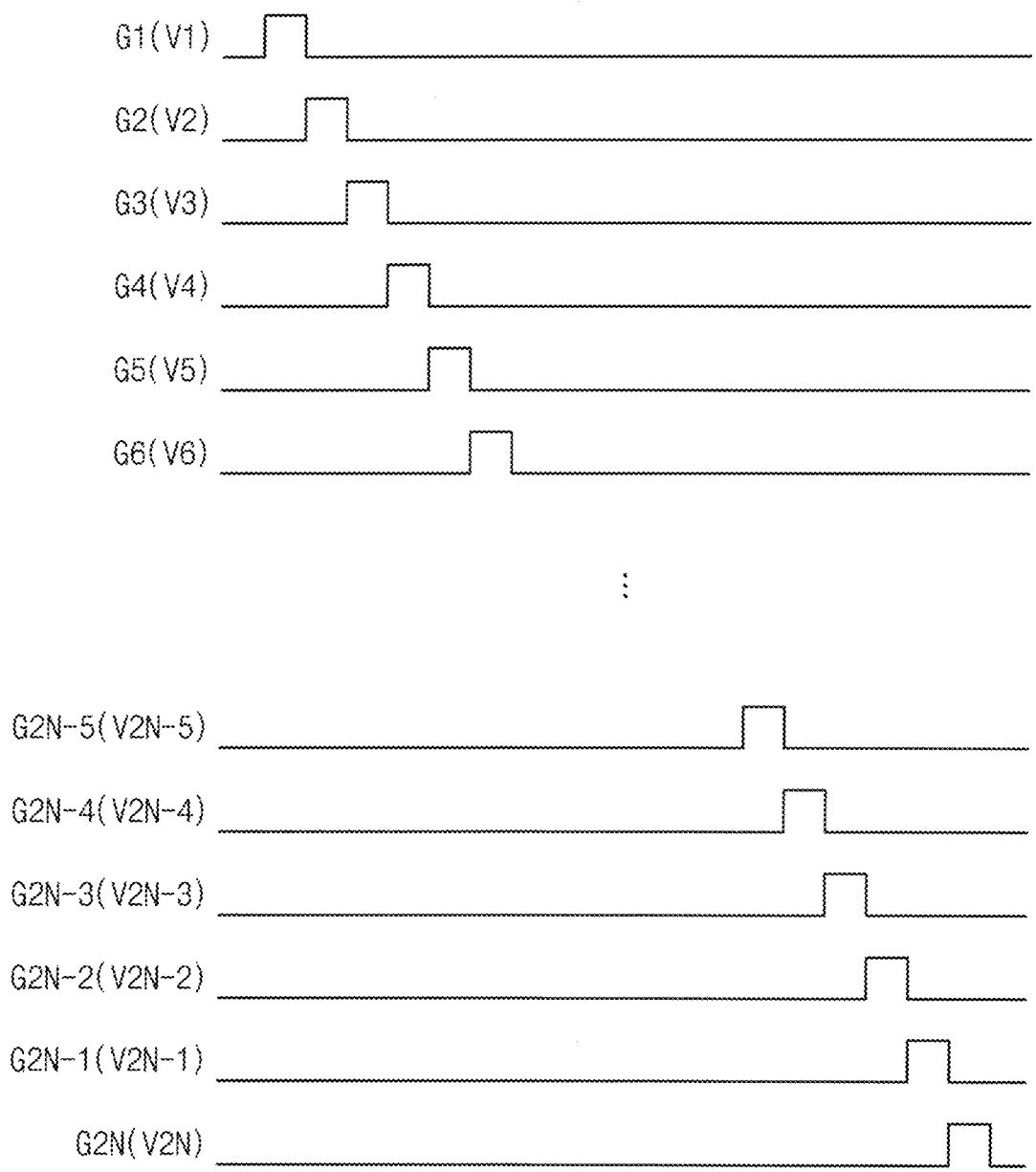
FIG. 13 is a timing diagram illustrating an example of gate signals applied to the second-gate lines of FIG. 12.

FIG. 13 is a timing diagram illustrating an example of gate signals applied to the second-gate lines of FIG. 12.

Referring to FIGS. 11 to 13, when the gate signals G1 to G2N are sequentially applied to the first second-gate line V1 of FIG. 12 to the 2N-th second-gate line of FIG. 12, the odd numbered first-gate lines H1, H3, H5, H7, . . . , H2N−7, H2N−5, H2N−3 and H2N−1 in the first area may be scanned during the first subframe and the even numbered first-gate lines H2, H4, H6, H8, . . . , H2N−6, H2N−4, H2N−2 and H2N in the second area may be scanned during the second subframe after the first subframe. When the gate signals G1 to G2N are sequentially applied to the first second-gate line V1 of FIG. 12 to the 2N-th second-gate line of FIG. 12, the display panel 100 may be driven in an interlace driving method.

Figure 14:
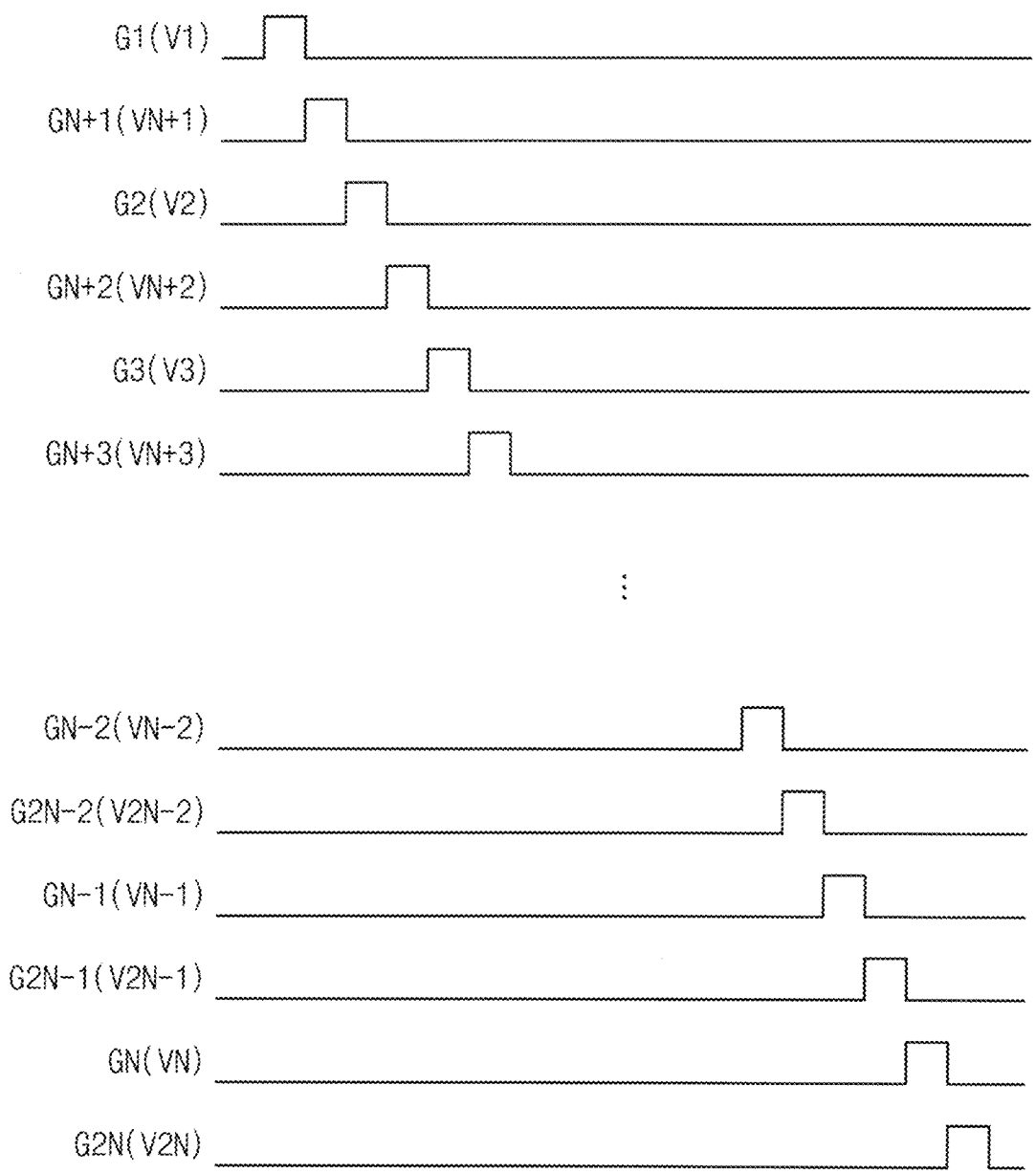
FIG. 14 is a timing diagram illustrating an example of gate signals applied to the second-gate lines of FIG. 12.

FIG. 14 is a timing diagram illustrating an example of gate signals applied to the second-gate lines of FIG. 12.

Referring to FIGS. 11, 12 and 14, the gate signals G1 to G2N may be alternately applied to the second-gate line V1 to VN in the first area and the second-gate line VN+1 to V2N in the second area. When the gate signals G1 to G2N are alternately applied to the second-gate line V1 to VN in the first area and the second-gate line VN+1 to V2N in the second area, the first-gate lines H1 to H2N in the block (e.g., BL1) may be sequentially scanned. When the first-gate lines H1 to H2N in the block (e.g., BL1) are sequentially scanned, it is referred to a progressive driving method.

As shown in FIG. 14, for example, a first pulse may be output to the first second-gate line V1 which is connected to the first first-gate line H1, a second pulse may be output to the N+1-th second-gate line V2N+1 which is connected to the second first-gate line H2, a third pulse may be output to the second second-gate line V2 which is connected to the third first-gate line H3 and a fourth pulse may be output to the N+2-th second-gate line VN+2 which is connected to the fourth first-gate line H4.

According to an embodiment, the gate driver 300 and the data driver 500 are disposed at one side of the display panel 100 such that the bezel width of the side portion of the display panel 100 may be reduced.

In addition, the first-gate lines H1 to H2N−1 and the second-gate lines V1 to VN are connected one-to-one in the first area of the block (e.g., BL1) of the display panel 100, and the first-gate lines H2 to H2N and the second-gate lines VN+1 to V2N are connected one-to-one in the second area of the block (e.g., BL1) such that the propagation delay of the gate signal at a bottom side portion of the display panel 100 may be reduced. Thus, the display quality of the display panel 100 may be enhanced.

Figure 15:
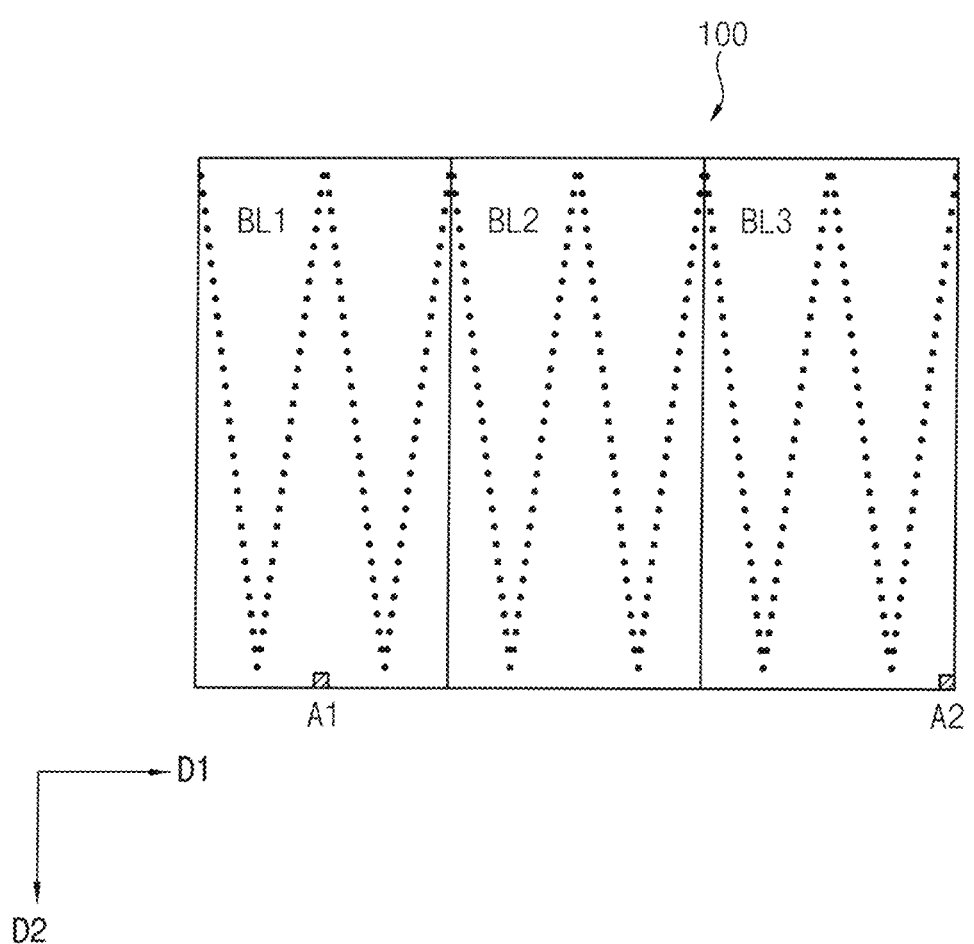
FIG. 15 is a schematic diagram illustrating connection between a first-gate line and a second-gate line of a display panel according to an embodiment of the present inventive concept.
Figure 16:
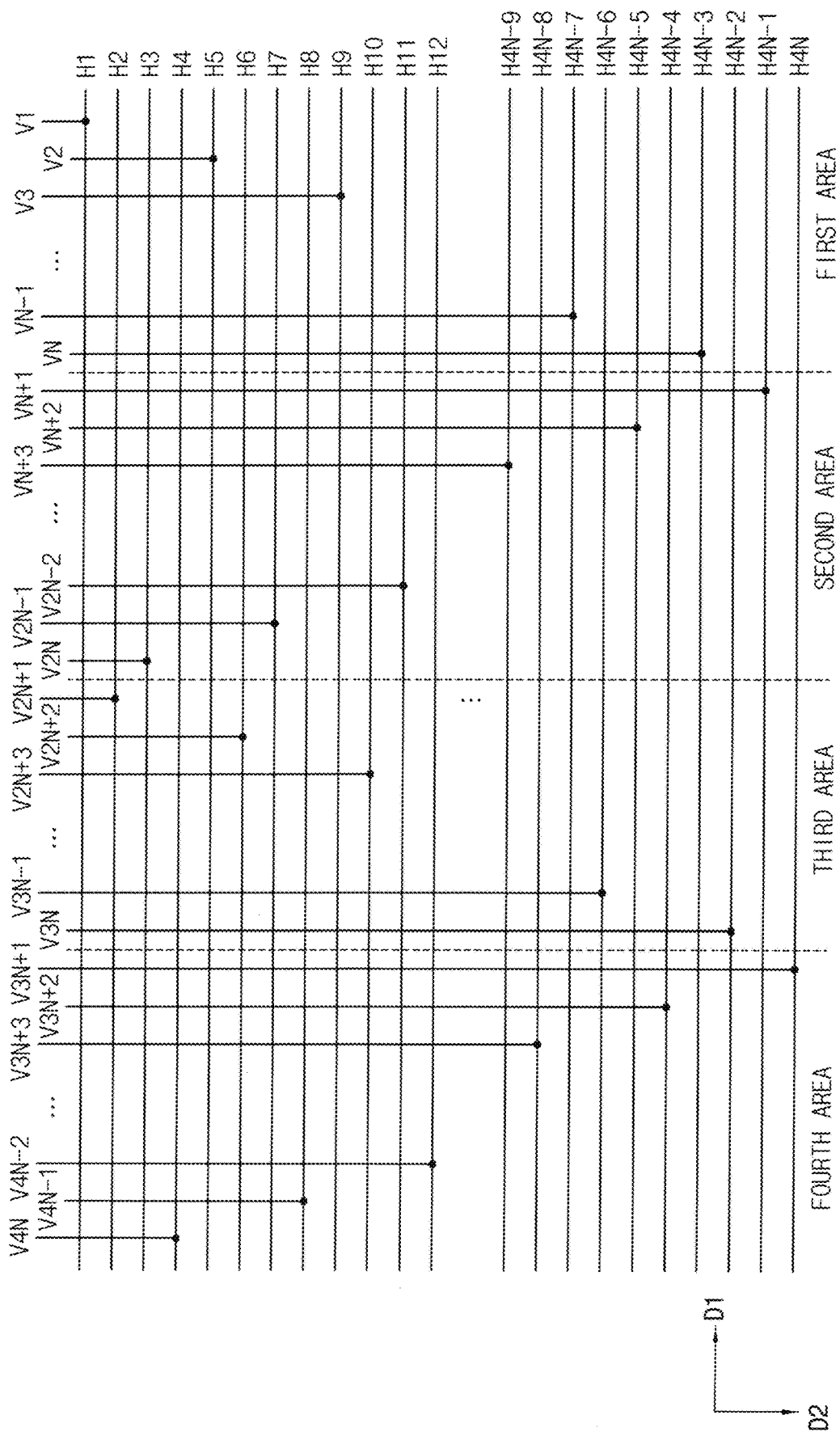
FIG. 16 is a detailed diagram illustrating the connection between the first-gate line and the second-gate line of FIG. 15.

FIG. 15 is a schematic diagram illustrating connection between a first-gate line and a second-gate line of a display panel according to an embodiment of the present inventive concept. FIG. 16 is a detailed diagram illustrating the connection between the first-gate line and the second-gate line of FIG. 15.

The display panel, the display apparatus and the method of driving the display panel according to the present embodiment is substantially the same as the display panel, the display apparatus and the method of driving the display panel of the previous embodiment explained referring to FIGS. 1 to 10 except for the connection structure between the first-gate lines and the second-gate lines. Thus, the same reference numerals will be used to refer to the same or like parts as those described in the previous embodiment of FIGS. 1 to 10 and any repetitive explanation concerning the above elements will be omitted.

Referring to FIGS. 1 to 4D, 15 and 16, the display apparatus includes a display panel 100 and a display panel driver. The display panel driver includes a driving controller 200, a gate driver 300, a gamma reference voltage generator 400 and a data driver 500.

The display panel 100 may include a first block BL1, a second block BL2 and a third block BL3. Although the display panel 100 includes three blocks BL1, BL2 and BL3 in the present embodiment, the present inventive concept may not be limited to this number of the blocks.

In FIG. 15, connecting points between the first-gate lines H1 to H2N and the corresponding second-gate lines V1 to V2N are represented as circular dots. In FIG. 15, each of the blocks BL1, BL2 and BL3 may be divided into four areas.

In FIG. 16, the second-gate lines (e.g., V1 to VN) disposed in a first area (e.g., rightmost-quarter) of the block (e.g., BL1) may be connected to 4X−3-th first-gate lines H1, H5, H9, . . . , H4N−7 and H4N−3 among the first-gate lines one-to-one. Here, X is an integer from 1 to N. In FIG. 16, the second-gate lines (e.g., VN+1 to V2N) disposed in a second area of the block (e.g., BL1) may be connected to 4X−1-th first-gate lines H4N−1, H4N−5, H4N−9, . . . , H11, H7 and H3 among the first-gate lines in a one-to-one manner. The second area of the block (e.g., BL1) is adjacent to the first area of the block (e.g., BL1) in the first direction D1. In FIG. 16, the second-gate lines (e.g., V2N+1 to V3N) disposed in a third area of the block (e.g., BL1) may be connected to 4X−2-th first-gate lines H2, H6, H10, . . . , H4N−6 and H4N−2 among the first-gate lines one-to-one. The third area of the block (e.g., BL1) is adjacent to the second area of the block (e.g., BL1) in the first direction D1. In FIG. 16, the second-gate lines (e.g., V3N+1 to V4N) disposed in a fourth area (e.g., leftmost-quarter) of the block (e.g., BL1) may be connected to 4X-th first-gate lines H4N, H4N−4, H4N−8, . . . , H12, H8 and H4 among the first-gate lines one-to-one. The fourth area of the block (e.g., BL1) is adjacent to the third area of the block (e.g., BL1) in the first direction D1. Herein, the number of the first-gate lines may be 4N in total. X may be an integer between 1 to N.

In each block of FIG. 15, a first line (i.e., a first virtual line) connecting the circular dots where the first-gate lines and the corresponding second-gate lines are connected in the first area, a second line (i.e., a second virtual line) connecting the circular dots where the first-gate lines and the corresponding second-gate lines are connected in the second area, a third line (i.e., a third virtual line) connecting the circular dots where the first-gate lines and the corresponding second-gate lines are connected in the third area and a fourth line (i.e., a fourth virtual line) connecting the circular dots where the first-gate lines and the corresponding second-gate lines are connected in the fourth area may form a W-shape.

In an embodiment, for example, in FIG. 16, a first second-gate line V1 may be connected to a first first-gate line H1, a second second-gate line V2 may be connected to a fifth first-gate line H5, an N−1-th second-gate line VN−1 may be connected to a 4N−7-th first-gate line H4N−7, and an N-th second-gate line VN may be connected to a 4N−3-th first-gate line H4N−3 in the first area. An N+1-th second-gate line VN+1 may be connected to a 4N−1-th first-gate line H4N−1, an N+2-th second-gate line VN+2 may be connected to a 4N−5-th first-gate line H4N−5, a 2N−1-th second-gate line V2N−1 may be connected to a seventh first-gate line H7, and a 2N-th second-gate line V2N may be connected to a third first-gate line H3 in the second area. A 2N+1-th second-gate line V2N+1 may be connected to a second first-gate line H2, a 2N+2-th second-gate line V2N+2 may be connected to a sixth first-gate line H6, a 3N−1-th second-gate line V3N−1 may be connected to a 4N−6-th first-gate line H4N−6, and a 3N-th second-gate line V3N may be connected to a 4N−2-th first-gate line H4N−2 in the third area. A 3N+1-th second-gate line V3N+1 may be connected to a 4N-th first-gate line H4N, a 3N+2-th second-gate line V3N+2 may be connected to a 4N−4-th first-gate line H4N−4, a 4N−1-th second-gate line V4N−1 may be connected to an eighth first-gate line H8, and a 4N-th second-gate line V4N may be connected to a fourth first-gate line H4 in the fourth area.

In the present embodiment, positions of the first to fourth areas may be changed or switched. In the first to fourth areas, the second-gate lines V1 to V4N may be connected to the 4X-th first-gate lines which are a multiple of four, the 4X−3-th first-gate lines whose remainder is one when divided by four, the 4X−2-th first-gate lines whose remainder is two when divided by four and the 4X−1-th first-gate lines whose remainder is three when divided by four, respectively.

In the present embodiment, a propagation delay of a gate signal transmitted to a first position A1 which is a bottom center position in the first block BL1 may be a sum of a propagation delay corresponding to a height of the display panel 100 in the second direction D2 and a propagation delay corresponding to a quarter of a width of the first block BL1 in the first direction D1. Thus, the propagation delay of the gate signal transmitted to the first position A1 in the present embodiment may be reduced compared to the propagation delay of the gate signal transmitted to the first position A1 of the comparative embodiment of FIGS. 5 and 6.

In the present embodiment, a propagation delay of a gate signal transmitted to a second position A2 which is a bottom rightmost position in the third block BL3 may be a sum of a propagation delay corresponding to the height of the display panel 100 in the second direction D2 and a propagation delay corresponding to a quarter of the width of the third block BL3 in the first direction D1. Thus, the propagation delay of the gate signal transmitted to the second position A2 in the present embodiment may be reduced compared to the propagation delay of the gate signal transmitted to the second position A2 of the comparative embodiment of FIGS. 5 and 6.

The interlace driving method of FIG. 9 and the progressive driving method of FIG. 10 may be applied to the present embodiment in a manner similar to the methods described in FIGS. 9 and 10.

According to an embodiment, the gate driver 300 and the data driver 500 are disposed at one side of the display panel 100 such that the bezel width of the side portion of the display panel 100 may be reduced.

In addition, the first-gate lines H1 to H4N−1 and the second-gate lines V1 to VN are connected in a one-to-one manner in the first area of the block (e.g., BL1) of the display panel 100, the first-gate lines H3 to H4N−3 and the second-gate lines VN+1 to V2N are connected one-to-one in the second area of the block (e.g., BL1), the first-gate lines H2 to H4N−2 and the second-gate lines V2N+1 to V3N are connected in a one-to-one manner in the third area of the block (e.g., BL1), and the first-gate lines H4 to H4N and the second-gate lines V3N+1 to V4N are connected one-to-one in the fourth area of the block (e.g., BL1) such that the propagation delay of the gate signal at a bottom side portion of the display panel 100 may be reduced. Thus, the display quality of the display panel 100 may be enhanced.

According to the display panel, the display apparatus and the method of driving the display panel of the present embodiment as explained above, the bezel width of the display apparatus may be reduced and the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display panel comprising a plurality of blocks, the block comprising a plurality of first-gate lines extending in a first direction and a plurality of second-gate lines extending in a second direction different from the first direction,
wherein the first-gate lines are connected to corresponding second-gate lines one-to-one in the block,
wherein the block is divided into a first area and a second area,
wherein the second-gate lines disposed in the first area of the block are contiguous and are connected to odd numbered first-gate lines among the plurality of first-gate lines one-to-one, and
wherein the second-gate lines disposed in the second area of the block are contiguous and are connected to even numbered first-gate lines among the plurality of first-gate lines one-to-one.

2. The display panel of claim 1, wherein the block further includes a plurality of data lines extending in the second direction.

3. The display panel of claim 2, wherein the first-gate lines are disposed on a first layer,
wherein the second-gate lines and the data lines are disposed on a second layer different from the first layer, and
wherein the first-gate lines are connected to the corresponding second-gate lines through contact holes.

4. The display panel of claim 2, wherein three data lines of the plurality of data lines are disposed between two adjacent second-gate lines of the plurality of gate lines.

5. The display panel of claim 1, wherein a first virtual line generated by connecting points where the first-gate lines and the corresponding second-gate lines are connected in the first area and a second virtual line generated by connecting points where the first-gate lines and the corresponding second-gate lines are connected in the second area form a V-shape.

6. The display panel of claim 5, wherein the plurality of first-gate lines includes first to 2N-th first-gate lines, the plurality of second-gate lines includes first to 2N-th second-gate lines, and N is an integer equal to or more than 2,
wherein the first second-gate line is connected to the first first-gate line, the second second-gate line is connected to the third first-gate line, the N−1-th second-gate line is connected to the 2N−3-th first-gate line and the N-th second-gate line is connected to the 2N−1-th first-gate line in the first area, and
wherein the N+1-th second-gate line is connected to the 2N-th first-gate line, the N+2-th second-gate line is connected to the 2N−2-th first-gate line, the 2N−1-th second-gate line is connected to the fourth first-gate line and the 2N-th second-gate line is connected to the second first-gate line in the second area.

7. The display panel of claim 1, wherein a first virtual line generated by connecting points where the first-gate lines and the corresponding second-gate lines are connected in the first area and a second virtual line generated by connecting points where the first-gate lines and the corresponding second-gate lines are connected in the second area are parallel to each other.

8. The display panel of claim 7, wherein the plurality of first-gate lines includes first to 2N-th first-gate lines, the plurality of second-gate lines includes first to 2N-th second-gate lines, and N is an integer equal to or more than 2,
wherein the first second-gate line is connected to the first first-gate line, the second second-gate line is connected to the third first-gate line, the N−1-th second-gate line is connected to the 2N−3-th first-gate line and the N-th second-gate line is connected to the 2N−1-th first-gate line in the first area, and
wherein the N+1-th second-gate line is connected to the second first-gate line, the N+2-th second-gate line is connected to the fourth first-gate line, the 2N−1-th second-gate line is connected to the 2N−2-th first-gate line and the 2N-th second-gate line is connected to the 2N-th first-gate line in the second area.

9. A display panel comprising a plurality of blocks, the block comprising a plurality of first-gate lines extending in a first direction and a plurality of second-gate lines extending in a second direction different from the first direction,
wherein the first-gate lines are connected to corresponding second-gate lines one-to-one in the block,
wherein the block is divided into first to fourth areas,
wherein the second-gate lines disposed in the first area of the block are connected to 4X−3-th first-gate lines among the plurality of first-gate lines one-to-one,
wherein the second-gate lines disposed in the second area of the block are connected to 4X−1-th first-gate lines among the plurality of first-gate lines one-to-one,
wherein the second-gate lines disposed in the third area of the block are connected to 4X−2-th first-gate lines among the plurality of first-gate lines one-to-one, wherein the second-gate lines disposed in the fourth area of the block are connected to 4X-th first-gate lines among the plurality of first-gate lines one-to-one, and wherein X is a natural number.

10. The display panel of claim 9, wherein a first virtual line generated by connecting points where the first-gate lines and the corresponding second-gate lines are connected in the first area, a second virtual line generated by connecting points where the first-gate lines and the corresponding second-gate lines are connected in the second area, a third virtual line generated by connecting points where the first-gate lines and the corresponding second-gate lines are connected in the third area and a fourth virtual line generated by connecting points where the first-gate lines and the corresponding second-gate lines are connected in the fourth area form a W-shape.

11. The display panel of claim 10, wherein the plurality of first-gate lines includes first to 4N-th first-gate lines, the plurality of second-gate lines includes first to 4N-th second-gate lines, and N is an integer equal to or more than 2,
wherein the first second-gate line is connected to the first first-gate line, the second second-gate line is connected to the fifth first-gate line, the N−1-th second-gate line is connected to the 4N−7-th first-gate line and the N-th second-gate line is connected to the 4N−3-th first-gate line in the first area,
wherein the N+1-th second-gate line is connected to the 4N−1-th first-gate line, the N+2-th second-gate line is connected to the 4N−5-th first-gate line, the 2N−1-th second-gate line is connected to the seventh first-gate line and the 2N-th second-gate line is connected to the third first-gate line in the second area,
wherein the 2N+1-th second-gate line is connected to the second first-gate line, the 2N+2-th second-gate line is connected to the sixth first-gate line, the 3N−1-th second-gate line is connected to the 4N−6-th first-gate line and the 3N-th second-gate line is connected to the 4N−2-th first-gate line in the third area, and
wherein the 3N+1-th second-gate line is connected to the 4N-th first-gate line, the 3N+2-th second-gate line is connected to the 4N−4-th first-gate line, the 4N−1-th second-gate line is connected to the eighth first-gate line and the 4N-th second-gate line is connected to the fourth first-gate line in the fourth area.

12. A display apparatus comprising:
a display panel which displays an image;
a gate driver which outputs gate signals to the display panel; and
a data driver which outputs a data voltage to the display panel,
wherein the display panel comprises a plurality of blocks, the block comprising a plurality of first-gate lines extending in a first direction and a plurality of second-gate lines extending in a second direction different from the first direction,
wherein the first-gate lines are connected to corresponding second-gate lines one-to-one in the block,
wherein the block is divided into first to second areas,
wherein the second-gate lines disposed in the first area of the block are contiguous and are connected to odd numbered first-gate lines among the plurality of first-gate lines one-to-one, and
wherein the second-gate lines disposed in the second area of the block are contiguous and are connected to even numbered first-gate lines among the plurality of first-gate lines one-to-one.

13. The display apparatus of claim 12, wherein the block of the display panel includes a plurality of data lines extending in the second direction.

14. The display apparatus of claim 13, wherein the first-gate lines are disposed on a first layer,
wherein the second-gate lines and the data lines are disposed on a second layer different from the first layer, and
wherein the first-gate lines are connected to the corresponding second-gate lines through contact holes.

15. The display apparatus of claim 12, wherein a first virtual line generated by connecting points where the first-gate lines and the corresponding second-gate lines are connected in the first area and a second virtual line generated by connecting points where the first-gate lines and the corresponding second-gate lines are connected in the second area form a V-shape.

16. The display apparatus of claim 15, wherein the plurality of first-gate lines includes first to 2N-th first-gate lines, the plurality of second-gate lines includes first to 2N-th second-gate lines, and N is an integer equal to or more than 2,
wherein the first second-gate line is connected to the first first-gate line, the second second-gate line is connected to the third first-gate line, the N−1-th second-gate line is connected to the 2N−3-th first-gate line and an N-th second-gate line is connected to a 2N−1-th first-gate line in the first area, and
wherein the N+1-th second-gate line is connected to the 2N-th first-gate line, the N+2-th second-gate line is connected to the 2N−2-th first-gate line, the 2N−1-th second-gate line is connected to the fourth first-gate line and the 2N-th second-gate line is connected to the second first-gate line in the second area.

17. The display apparatus of claim 15, wherein the gate signals are sequentially applied to the second-gate lines such that the odd numbered first-gate lines in the first area are scanned during a first subframe and the even numbered first-gate lines in the second area are scanned during a second subframe after the first subframe.

18. The display apparatus of claim 15, wherein the gate signals are alternately applied to the second-gate line in the first area and the second-gate line in the second area such that the first-gate lines in the block are sequentially scanned.

19. The display apparatus of claim 12, wherein a first virtual line generated by connecting points where the first-gate lines and the corresponding second-gate lines are connected in the first area and a second virtual line generated by connecting points where the first-gate lines and the corresponding second-gate lines are connected in the second area are parallel to each other.

20. The display apparatus of claim 19, wherein the plurality of first-gate lines includes first to 2N-th first-gate lines, the plurality of second-gate lines includes first to 2N-th second-gate lines, and N is an integer equal to or more than 2,
wherein the first second-gate line is connected to the first first-gate line, the second second-gate line is connected to the third first-gate line, the N−1-th second-gate line is connected to the 2N−3-th first-gate line and the N-th second-gate line is connected to the 2N−1-th first-gate line in the first area, and
wherein the N+1-th second-gate line is connected to the second first-gate line, the N+2-th second-gate line is connected to the fourth first-gate line, the 2N−1-th second-gate line is connected to the 2N−2-th first-gate line and the 2N-th second-gate line is connected to the 2N-th first-gate line in the second area.

21. The display apparatus of claim 19, wherein the gate signals are sequentially applied to the second-gate lines such that the odd numbered first-gate lines in the first area are scanned during a first subframe and the even numbered first-gate lines in the second area are scanned during a second subframe after the first frame.

22. The display apparatus of claim 19, wherein the gate signals are alternately applied to the second-gate line in the first area and the second-gate line in the second area such that the first-gate lines in the block are sequentially scanned.

23. The display apparatus of claim 12, further comprising a flexible circuit substrate,
wherein the gate driver includes a gate driving chip,
wherein the data driver includes a first source driving chip and a second source driving chip, and
wherein the first source driving chip, the gate driving chip and the second source driving chip are sequentially disposed in the flexible circuit substrate.

24. A method of driving a display panel comprising a plurality of blocks, the block comprising a plurality of first-gate lines extending in a first direction, a plurality of second-gate lines extending in a second direction different from the first direction, and a plurality of data lines extending in the second direction, the method comprising:
applying gate signals to the second-gate lines disposed in a first area of the block of the display panel;
applying gate signals to the second-gate lines disposed in a second area of the block of the display panel; and
applying data voltages to the data lines of the display panel,
wherein the first-gate lines are connected to corresponding second-gate lines one-to-one in the block,
wherein the second-gate lines disposed in the first area are contiguous and are connected to odd numbered first-gate lines among the plurality of first-gate lines one-to-one, and
wherein the second-gate lines disposed in the second area of the block are contiguous and are connected to even numbered first-gate lines among the plurality of first-gate lines one-to-one.

\* \* \* \* \*